United States Patent
Yajima et al.

(10) Patent No.: US 10,270,768 B2
(45) Date of Patent: Apr. 23, 2019

(54) COMMUNICATION SYSTEM, COMMUNICATION METHOD, AND COMMUNICATION DEVICE

(71) Applicant: FUJITSU LIMITED, Kawasaki-shi, Kanagawa (JP)

(72) Inventors: Jun Yajima, Kawasaki (JP); Takayuki Hasebe, Kawasaki (JP); Naoya Torii, Hachioji (JP); Tsutomu Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 170 days.

(21) Appl. No.: 15/403,279

(22) Filed: Jan. 11, 2017

(65) Prior Publication Data

US 2017/0208065 A1    Jul. 20, 2017

(30) Foreign Application Priority Data

Jan. 15, 2016  (JP) .................................. 2016-006646

(51) Int. Cl.
*H04L 29/06*    (2006.01)

(52) U.S. Cl.
CPC ...... *H04L 63/0876* (2013.01); *H04L 63/1416* (2013.01)

(58) Field of Classification Search
CPC ........................ H04L 63/0876; H04L 63/1416
USPC ............................................................. 726/6
See application file for complete search history.

(56) References Cited

U.S. PATENT DOCUMENTS

| 2014/0310530 A1 | 10/2014 | Oguma et al. |
| 2015/0172298 A1 | 6/2015 | Otsuka |

FOREIGN PATENT DOCUMENTS

| JP | 2015-114907 | 6/2015 |
| WO | 2013065689 | 5/2013 |
| WO | 2015151418 | 10/2015 |

OTHER PUBLICATIONS

Tanabe, Masato et al., "A Secure Switching Method between Monitoring Mode and Verifying Mode for In-Vehicle Network," SCIS 2015, The 32nd Symposium on Cryptography and Information Security Kokura, Japan. Jan. 20-23, 2015, The Institute of Electronics, Information and Communication Engineer, 18 pages, with Partial English Translation of Chapter 4.

*Primary Examiner* — Jason K Gee
*Assistant Examiner* — Angela R Holmes
(74) *Attorney, Agent, or Firm* — Fujitsu Patent Center

(57) ABSTRACT

A communication system includes a first communication device that determines, using identification information on a frame, whether to receive the frame, and a second communication device that belongs to a network identical to the first communication device. A report frame includes a detection of an attack on the network and target identification information that is identification information included in a frame used to perform the attack. When the first communication device receives a report frame from the second communication device, the first communication device sets the frame including the target identification information to be an authentication processing target. Upon transmitting a transmission frame set to be the authentication processing target, the first communication device transmits authentication information generated from the transmission frame along with the transmission frame.

7 Claims, 17 Drawing Sheets

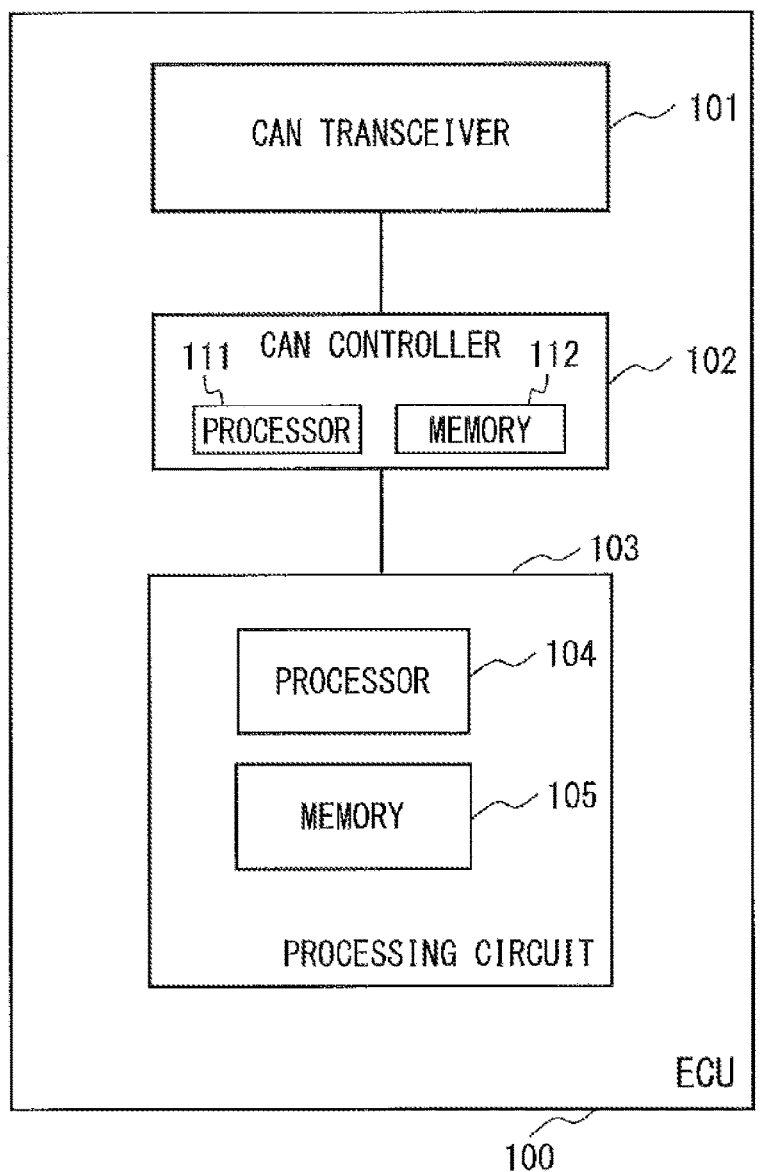
F I G. 3

FIG. 4

Frame F11:
| SOF | ARBITRATION | | | CTRL | | | DATA | CRC | | ACK | | EOF |
|---|---|---|---|---|---|---|---|---|---|---|---|---|
| | ID | RTR | IDE | | RESERVATION | DLC | | CRC SEQUENCE | CRC DELIMITER | ACK SLOT | ACK DELIMITER | |
| 1 | 11 | 1 | 1 | | 1 | 4 | 0-64 | 15 | 1 | 1 | 1 | 7 |

Frame F12:
| SOF | ARBITRATION | | | | | CTRL | | | DATA | CRC | | ACK | | EOF |
|---|---|---|---|---|---|---|---|---|---|---|---|---|---|---|
| | ID BASE | SRR | IDE | ID EXTENSION | RTR | r1 | RESERVATION | DLC | | CRC SEQUENCE | CRC DELIMITER | ACK SLOT | ACK DELIMITER | |
| 1 | 11 | 1 | 1 | 18 | 1 | 1 | 1 | 4 | 0-64 | 15 | 1 | 1 | 1 | 7 |

| TRANSMISSION TARGET ID | AUTHENTICATION FLAG |
|---|---|
| 123 | OFF |
| 234 | OFF |
| 456 | OFF |
| ... | ... |

31a_1

| RECEPTION TARGET ID | AUTHENTICATION FLAG |
|---|---|
| 123 | OFF |
| 345 | OFF |
| 457 | OFF |
| ... | ... |

32b_1

| RECEPTION TARGET ID | AUTHENTICATION FLAG |
|---|---|
| 456 | OFF |

32c

| NON-RECEPTION-TARGET ID |
|---|
| 123 |
| 234 |
| 456 |
| ... |

33a

F I G. 5

| TRANSMISSION TARGET ID | AUTHENTICATION FLAG |
|---|---|
| 123 | ON |
| 234 | OFF |
| 456 | OFF |
| ... | ... |

~ 31a_2

| TYPE=REPORT FRAME |
|---|
| TARGET ID=123 |

~ M1

| RECEPTION TARGET ID | AUTHENTICATION FLAG |
|---|---|
| 123 | ON |
| 345 | OFF |
| 457 | OFF |
| ... | ... |

~ 32b_2

F I G. 7

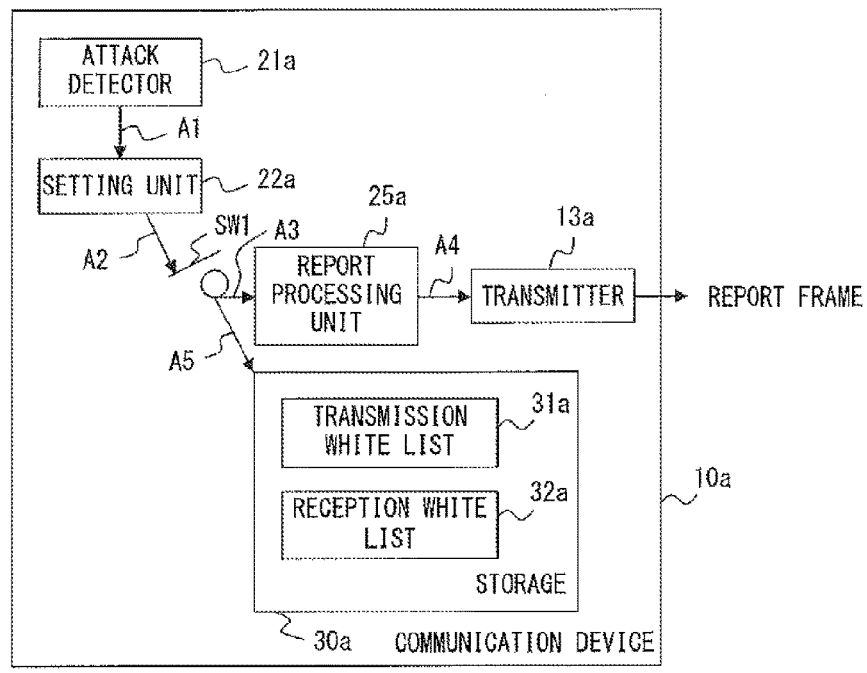
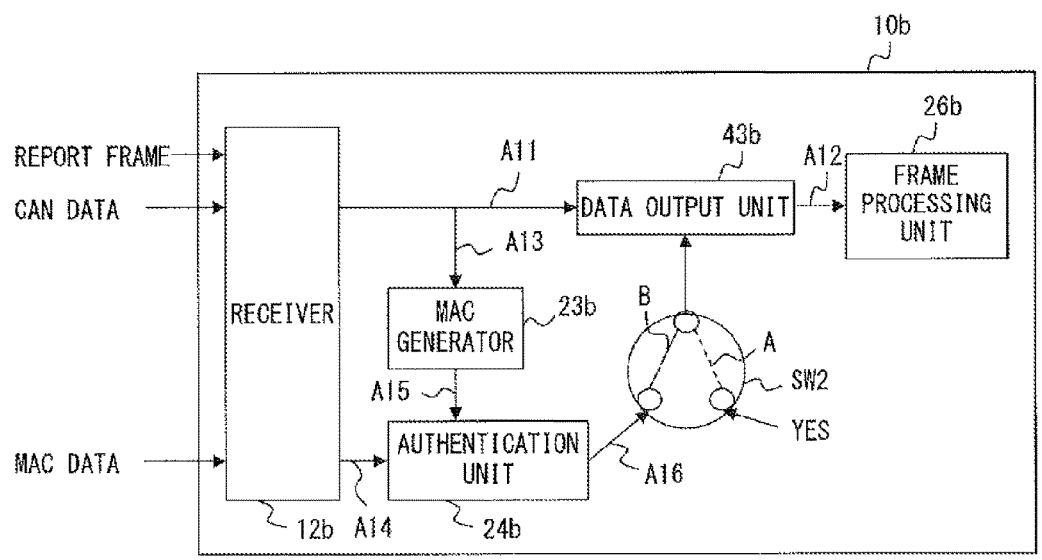
F I G. 1 0

COMMUNICATION SYSTEM, COMMUNICATION METHOD, AND COMMUNICATION DEVICE

CROSS-REFERENCE TO RELATED APPLICATION

This application is based upon and claims the benefit of priority of the prior Japanese Patent Application No. 2016-006646, filed on Jan. 15, 2016, the entire contents of which are incorporated herein by reference.

FIELD

The embodiments discussed herein are related to communication performed between devices in a network.

BACKGROUND

A network technology that is called a CAN (controller area network) may be used for performing transmission and reception of data or control information between devices that are used for an on-board network of a vehicle or a factory automation. A system in which the CAN is used includes a plurality of ECUs (electronic control units). The ECUs communicate with one another by performing transmission and reception of a frame. In the CAN, a data-frame that is used for communication includes identification information (ID) used for identifying a frame. Further, each of the ECUs has stored therein an ID of a frame to be received. In CAN, a frame is broadcasted, and each of the ECUs receives a frame that includes an ID that is set to be received by the ECU but discards a frame that includes an ID that is not set to be received.

However, when an attack has been performed on a network using a frame including an ID that has been set to be received by an ECU, the ECU will receive the frame used for the attack. Thus, in order to prevent such an attack, a verification method has been proposed that uses a message authentication code (MAC) generated from data, an ID, and a counter value corresponding to the ID. A communication system has been devised that an ECU transmits an error-frame before an end portion of a transmitted frame is transmitted, if the content in a prescribed field in the transmitted frame satisfies a prescribed condition that indicates incorrectness. Further, a system has also been proposed wherein, when it fails in performing authentication using information for authentication included in data that is transmitted by a device from among a plurality of devices connected to one another through a bus, the system determines that a transmission source of the data has spoofed another device to transmit improper data, and invalidates the data.

For example, the documents such as International Publication Pamphlet No. WO 2013/065689, International Publication Pamphlet No. 2015/151418, and Japanese Laid-open Patent Publication No. 2015-114907 are known.

When a MAC authentication is performed every time each device in a CAN system receives a frame, all of the devices in the system each transmit and receive both a frame that includes data and a frame that includes a MAC, so the devices in the network are under heavy load. Even if any of the technologies described above are used, processing such as authentication will be performed on a frame for which an attack has not been detected in addition to a frame for which an attack has been detected.

SUMMARY

According to an aspect of the embodiments, a communication system includes a first communication device that determines, using identification information on a frame, whether to receive the frame, and a second communication device that belongs to a network identical to the first communication device. A report frame includes information indicating that an attack on the network has been detected and target identification information that is identification information included in a frame used to perform the attack. When the first communication device receives a report frame from the second communication device, the first communication device sets the frame including the target identification information to be an authentication processing target. Upon transmitting a transmission frame set to be the authentication processing target, the first communication device transmits authentication information generated from the transmission frame along with the transmission frame.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates an example of a hardware configuration of the communication device;

FIG. 4 illustrates an example of formats of frames that are transmitted and received;

FIG. 5 illustrates examples of pieces of information held by the communication device;

FIG. 7 illustrates examples of updating a table and an example of a report frame when an attack has been detected;

FIG. 10 is a diagram that explains an example of processing performed when an attack has been detected;

DESCRIPTION OF EMBODIMENTS

Figure 1:
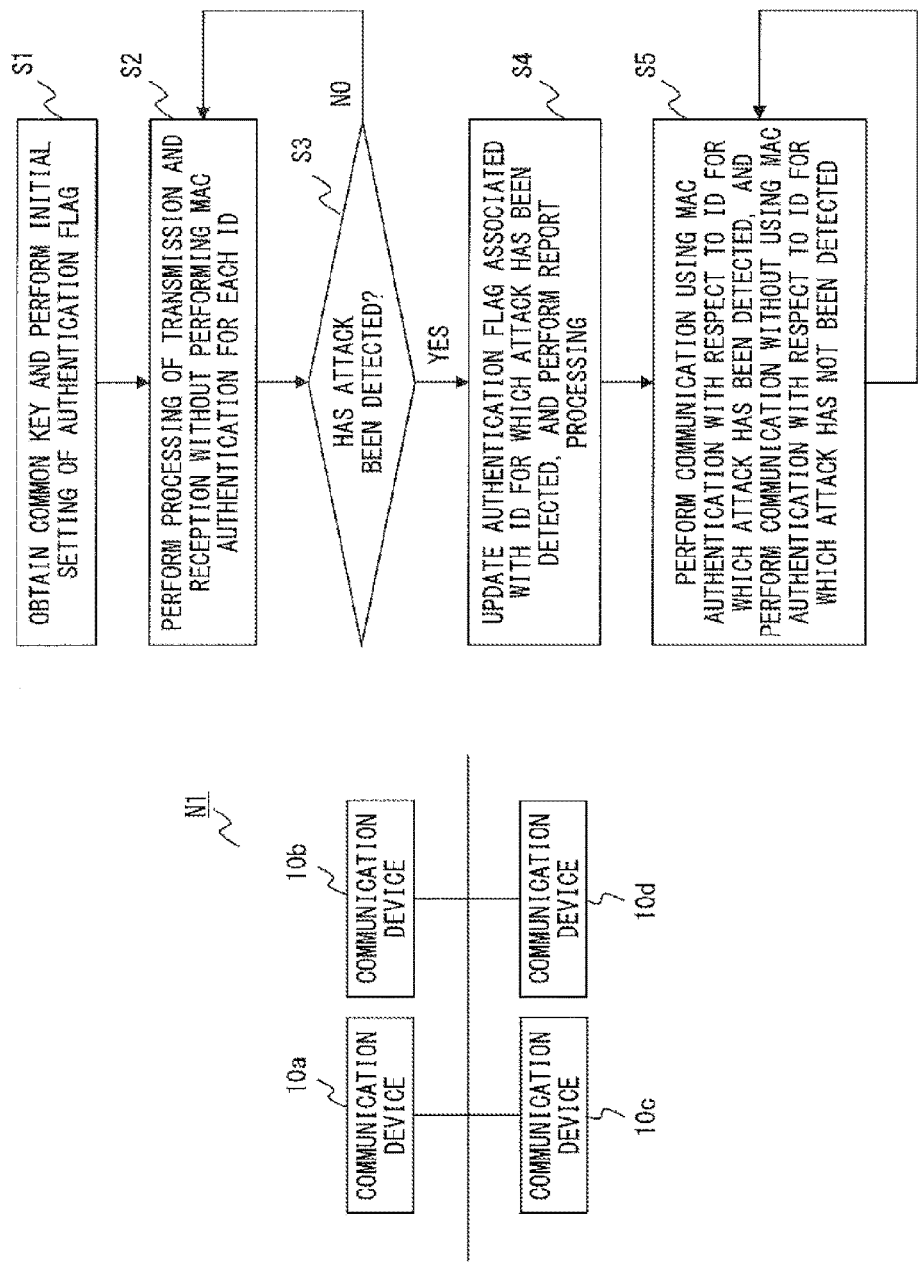
FIG. 1 is a diagram that explains an example of a communication method according to embodiments.

FIG. 1 is a diagram that explains an example of a communication method according to embodiments. A network N1 is an example of a CAN network for which a communication method according to the embodiments is used. In the network N1, communication devices 10 (10a to 10d) are connected to one another through a bus. The communication devices 10 communicate with one another by performing transmission and reception of a frame through the bus.

Each of the communication devices 10 included in the network N1 transmits and receives a frame without performing a MAC authentication on every ID until an attack is detected in one of the communication devices 10, and with respect to an ID for which an attack has been detected, a MAC authentication is performed upon receiving its frame. An example of communication processing performed by each of the communication devices 10 included in the CAN network represented by the network N1 is represented by the flowchart of FIG. 1.

In Step S1, in communication with other communication devices 10 in the network, a communication device 10 obtains a common key used to generate a MAC and performs an initial setting of a flag (an authentication flag) used to determine whether authentication is to be performed on each ID. It is assumed that a counter value and a common key that are used to perform a MAC authentication are obtained for each ID transmitted or received by the communication device 10. It is assumed that authentication flags associated with all of the IDs are set to OFF in the initial setting. It is assumed that, in the following descriptions, authentication flag=ON indicates performing transmission and reception of a frame using a MAC authentication, and authentication flag=OFF indicates performing transmission and reception of a frame without performing a MAC authentication.

When the initial setting has been completed, each of the communication devices 10 included in the network N1 transmits and receives a frame without performing a MAC authentication on every ID until an attack is detected in one of the communication devices 10 (Step S2, No in Step S3).

When an attack on the network N1 has been detected, the communication device 10 updates, to ON, an authentication flag associated with an ID for which the attack has been detected, and reports to the other communication devices 10 in the network N1 about the detection of an attack (Yes in Step S3, Step S4). In this case, the detection of an attack is reported using a report frame that reports on the ID for which the attack has been detected. It is assumed that the report frame is transmitted using an ID that is a reception target for all of the communication devices 10 in the network. A communication device 10 which has received the report frame updates the authentication flag for the ID reported by the report frame to ON, so as to perform a setting to perform a MAC authentication when communication is performed using the reported ID.

After that, a MAC authentication is performed upon transmitting and receiving a frame including an ID for which an attack has been detected, and a MAC authentication is not performed upon transmitting and receiving a frame including an ID for which an attack has not been detected (Step S5). In other words, a communication device 10 that transmits a frame including an ID for which authentication flag=ON is set transmits a MAC as information for authentication in addition to a data frame, the MAC being generated using data in the data frame. On the other hand, a communication device 10 that is supposed to receive an ID for which authentication flag=ON is set calculates a MAC from data in a data frame upon receiving a frame and compares a MAC for authentication transmitted from a transmission source with the MAC obtained by the calculation. When the MAC for authentication transmitted from the transmission source is identical to the MAC obtained by the calculation using the data, the communication device 10 processes the received frame.

As described above, in the communication method described with reference to FIG. 1, a MAC authentication is not performed with respect to an ID for which an attack has not been detected, and after an attack has been detected by one of the communication devices 10 in the network, a MAC authentication is performed when communication is performed using an ID for which an attack has been detected. Thus, even if an unauthorized access was performed using an ID for which an attack has been detected, the unauthorized access will be prevented because a communication device 10 that receives a frame performs a MAC authentication on a frame including the ID for which an attack has been detected. In addition, a MAC authentication is performed only on an ID for which an attack has been detected, so a load placed on a communication device 10 due to MAC authentication is lighter and a delay in performing processing is smaller, compared to when a system is used that performs a MAC authentication on every ID regardless of whether an attack has been detected. Thus, the system according to the embodiments makes it possible to protect a network while reducing a load placed on a device in the network.

It is conceivable that a MAC authentication will be performed only with respect to a portion of IDs regardless of whether an attack has been detected, in order to reduce a load due to MAC authentication, but in this case, there occurs a problem in which a delay in performing processing is caused for a frame identified by a specific ID. On the other hand, in the communication method according to the embodiments, a MAC authentication is performed only on a frame including an ID for which an attack has been detected, which also makes it possible to prevent a delay in performing processing when an attack has not occurred.

Example of Device Configuration and Example of Frame Format

In the following descriptions, it is assumed that a communication device 10 in a CAN network does not receive, from any other communication device 10, a frame that includes an ID to be attached to another frame that is to be transmitted by the communication device 10 itself.

Figure 2:
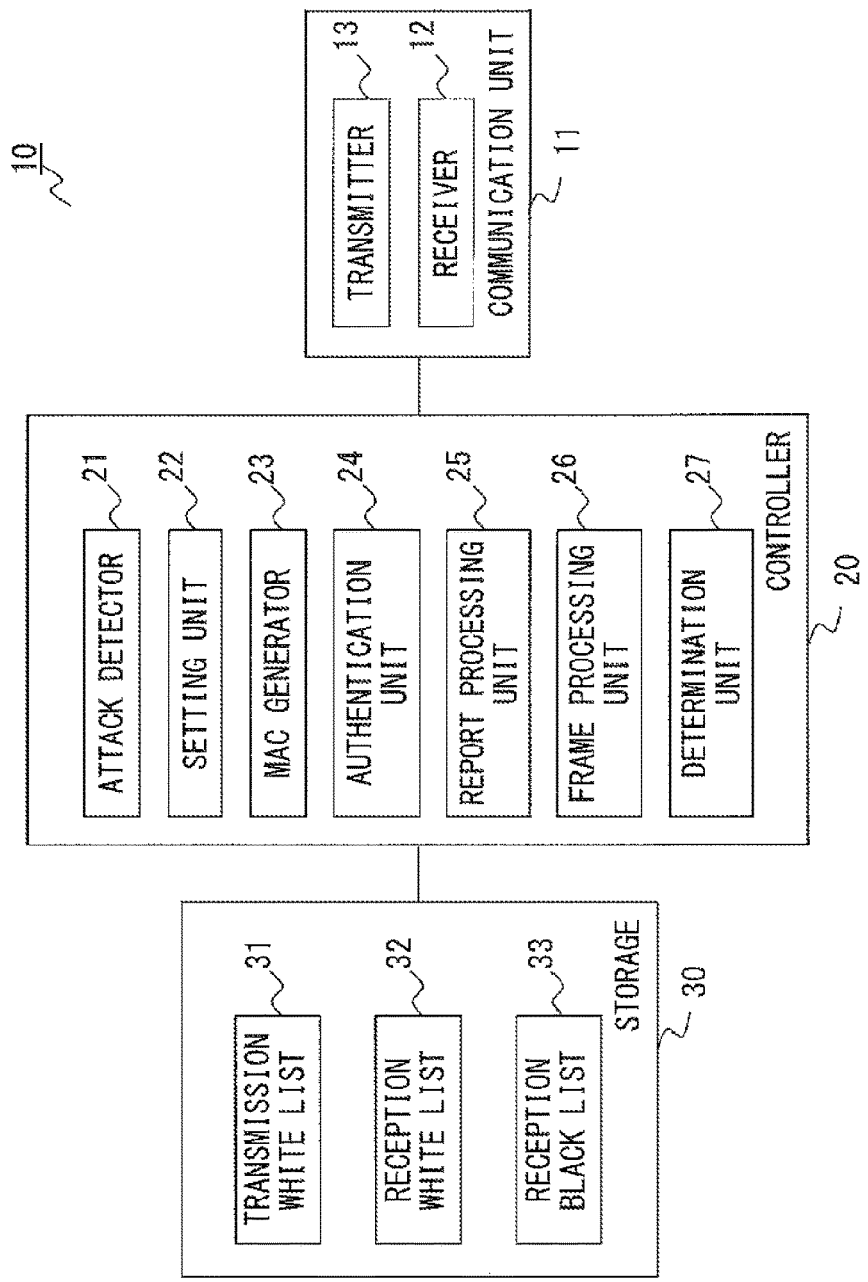
FIG. 2 illustrates an example of a configuration of a communication device.

FIG. 2 illustrates an example of a configuration of the communication device 10. The communication device 10 includes a communication unit 11, a controller 20, and a storage 30. The communication unit 11 includes a receiver 12 and a transmitter 13. The controller 20 includes an attack detector 21, a setting unit 22, a MAC generator 23, an authentication unit 24, a report processing unit 25, a frame processing unit 26, and a determination unit 27. The storage 30 has stored therein a transmission white list 31, a reception white list 32, and a reception black list 33, and further stores therein data used to perform processing in the controller 20 as appropriate.

The transmission white list 31 includes a list of an ID used to identify a frame to be transmitted by the communication device 10 to the other communication devices 10, and an authentication flag that is associated with each ID included in the list. The reception white list 32 includes an ID used to identify a frame to be received by the communication device 10, and an authentication flag that is associated with each ID. The reception black list 33 is a list of an ID as predicted to not be received by the communication device 10 if an attack on the CAN network has not occurred. For example, the reception black list 33 may be a list of an ID included in the transmission white list 31. Examples of the transmission white list 31, the reception white list 32, and the reception black list 33 will be described later.

The transmitter 13 transmits a frame to the other devices in the CAN network as appropriate. The receiver 12 receives a frame transmitted from the other devices in the CAN network. The receiver 12 outputs the received frame to the attack detector 21.

The attack detector 21 detects an attack on the network using the input frame. For example, when an ID included in the input frame is included in the reception black list 33, the attack detector 21 determines that an attack has been detected. When an attack has been detected in the attack detector 21, the report processing unit 25 generates a report frame and reports to the other devices about the occurrence of an attack. Further, when the input frame is a report frame, the attack detector 21 outputs the report frame to the setting unit 22. Using the report frame, the setting unit 22 changes an authentication flag included in the transmission white list 31 or the reception white list 32 as appropriate.

When a new attack has not been detected using the input frame, the attack detector 21 outputs, to the frame processing unit 26, a frame including an ID for which authentication flag=OFF is set in the reception white list 32. On the other hand, the attack detector 21 outputs, to the authentication unit 24, a frame including an ID for which authentication flag=ON is set in the reception white list 32.

The MAC generator 23 generates a MAC using data in a frame input to the authentication unit 24. The authentication unit 24 compares a MAC transmitted for authenticating a frame that includes data with the MAC generated in the MAC generator so as to perform a MAC authentication. When the MAC authentication has been successful, the authentication unit 24 outputs the frame to the frame processing unit 26. On the other hand, when the MAC authentication has not been successful, the authentication unit 24 determines that the received frame is a malicious frame, and discards it. The frame processing unit 26 processes the input data.

The determination unit 27 determines whether an ID included in a frame destined for the other communication devices 10 that is generated in the frame processing unit 26 is included in the transmission white list 31. When the ID included in the generated frame destined for the other communication devices is included in the transmission white list 31, the determination unit 27 transmits the generated frame through the transmitter 13. On the other hand, when the ID included in the generated frame destined for the other communication devices 10 is not included in the transmission white list 31, the determination unit 27 discards the frame. Alternatively, the determination unit 27 discards the frame and reports to the report processing unit 25 about the ID included in the discarded frame. Then, the report processing unit 25 generates a report frame that includes the ID reported from the determination unit 27 as an ID that may be used to perform an attack, and transmits the report frame to the other communication devices 10.

FIG. 2 is just an example, and, for example, depending on implementation, the communication device 10 may be designed such that it does not include the frame processing unit 26. For example, when the communication device 10 is realized as an adaptor that is another ECU to be connected between an ECU and a CAN or as a CAN controller in the ECU, there is a possibility that the communication device 10 will not include the frame processing unit 26. When the communication device 10 does not include the frame processing unit 26, the attack detector 21 or the authentication unit 24 outputs a frame to a device connected to the communication device 10 in order to perform processing similar to the processing performed by the frame processing unit 26. The determination unit 27 obtains the frame from the device connected to the communication device 10.

FIG. 3 illustrates an example of a hardware configuration of the communication device 10. In the example of FIG. 3, the communication device 10 is realized as an ECU 100. The ECU 100 includes a CAN transceiver 101, a CAN controller 102, and a processing circuit 103. The processing circuit 103 includes a processor 104 and a memory 105. The CAN controller 102 includes a processor 111 and a memory 112.

The CAN transceiver 101 performs processing such as an adjustment of bus voltage as appropriate, in order for the ECU 100 to communicate with the other devices in the CAN network. The CAN controller 102 performs processing such as a CRC (cyclic redundancy check) with respect to a received frame and a bit stuffing so as to extract data. The CAN controller 102 outputs the data to the processor 104. Both of the processors 104 and 111 are arbitrary processing circuits. The processor 104 reads a program stored in the memory 105 so as to perform processing. The program may be held by a non-transitory recording medium as appropriate. On the other hand, the processor 111 reads a program stored in the memory 112 so as to perform processing.

When the ECU 100 operates as the communication device 10, the communication unit 11 is realized by the CAN transceiver 101 and the CAN controller 102. The CAN transceiver 101 and the CAN controller 102 can be referred as "communication circuit".

As described later, the communication device 10 may be realized by the CAN controller 102. The controller 20 is realized by the processor 104 or the processor 111. The storage 30 is realized by the memory 105 or the memory 112. Further, data obtained by performing processing in the processor (104,111) or data used to perform processing in the processor (104,111) may also be stored in the memory 105 or the memory 112. A portion of or the entirety of the controller 20 may be realized by hardware, instead of the processor, such as a circuit suitable for performing processing in the controller 20.

FIG. 4 illustrates examples of formats of frames that are transmitted and received. F11 of FIG. 4 is an example of a format of a frame of a general specification, and F12 is an example of a format of a frame used in an extension specification.

The frame of a general specification includes an SOF (start of frame), an arbitration field, a control field, a data field, a CRC field, an ACK field, and an EOF (end of frame). The arbitration field includes an ID and an RTR (remote transmission request). Here, the ID is identification information used to identify a frame. The control field includes an IDE (identifier extension), a reservation bit, and a DLC (data length code). The CRC field includes a CRC sequence and a CRC delimiter. The ACK field includes an ACK slot and an ACK delimiter. The bit length of an information element included in each field is as given in the last line of F11. For example, the length of the ID is 11 bits, and the length of the data field is a variable length between 0 and 64 bits.

The frame used in an extension specification (F12) also includes an SOF, an arbitration field, a control field, a data field, a CRC field, an ACK field, and an EOF. The arbitration field in an extension specification includes an ID base, an SRR (substitute remote request bit), an IDE, an ID extension, and an RTR. In an extension specification, identification information (ID) on a frame is represented by a bit string obtained by placing a bit string stored as an ID extension after a bit string stored as an ID base. From the control field to the EOF, the format of an extension specification has a configuration similar to that of the format of a general specification. Further, the bit length of an information element included in each field is as given in the last line of F12. Thus, in the extended format, a bit string of 29 bits obtained by combining 11 bits of the ID base and bits of the ID extension is used as identification information on a transmission source. An example of processing performed in each embodiment is described below, using the case in which a frame that uses the format of F11 in FIG. 4 is transmitted and received. Processing is similarly performed also when the frame used to perform communication is an extended one.

First Embodiment

In order to facilitate identification of, for example, a device in operation, in the following descriptions, a reference numeral may be followed by a letter that is assigned to a communication device 10 to be identified. For example, an attack detector 21a is an attack detector 21 which is included in the communication device 10a. Further, in the following descriptions, another number may be placed after the number of a table, with an underscore between these numbers, in order to explain, for example, an update state of the table. A first embodiment will now be described, divided into an example of communication processing performed before and after a detection of an attack, an example of a method for generating a MAC, an example of a method for detecting an attack, and an example of a method for implementing with hardware, and after that, processing performed by the communication device 10 will be described in chronological order. In the first embodiment, an example in which communication is performed in the network N1 of FIG. 1 is described.

(1) Example of Communication Processing Performed Before and after Detection of Attack FIG. 5 illustrates examples of pieces of information held by the communication device 10. A transmission white list 31a_1 is an example of the transmission white list 31 held by the communication device 10a when communication has started. The transmission white list 31a_1 includes a transmission target ID and an authentication flag. The transmission target ID is identification information used to identify a frame that is to be transmitted by a communication device 10 which holds that transmission white list 31. The authentication flag represents whether a MAC authentication is to be performed on a frame that is identified by a transmission target ID included in each entry. In the example of FIG. 5, frames with ID=123, ID=234, and ID=456 are to be transmitted by the communication device 10a. Further, no attack has been detected for ID=123, ID=234, or ID=456, so the authentication flags for these IDs are set to OFF.

A reception white list 32b_1 is an example of the reception white list 32 held by the communication 10b when communication has started. The reception white list 32b_1 includes a reception target ID and an authentication flag. The reception target ID is identification information that identifies a frame that is to be received by a communication device 10 which holds that reception white list 32. The authentication flag indicates whether a MAC authentication is to be performed on a reception target ID included in each entry. In the example of FIG. 5, frames with ID=123, ID=345, and ID=457 are to be received by the communication device 10b. Further, no attack has been detected for ID=123, ID=345, or ID=457, so the authentication flags for these IDs are set to OFF.

Likewise, a reception white list 32c stores the information "authentication flag=OFF" that is associated with "reception target ID=456". Thus, the communication device 10c receives a frame with ID=456. Further, a MAC authentication is not performed upon transmitting and receiving a frame identified by ID=456.

A reception black list 33a is an example of the reception black list 33 held by the communication device 10a. The reception black list 33 is a list of an ID that identifies a frame that is predicted to not be received in a communication device 10 that holds that reception black list 33, except when communication is performed due to an attack on the CAN network. For example, when an attack has not been performed, the communication device 10a is predicted to not receive a transmission target ID in the communication device 10a, so the reception black list 33a may be identical to the transmission target IDs in the transmission white list 31a. In the example of FIG. 5, the reception black list 33a includes ID=123, ID=234, and ID=456, as in the case with the transmission target ID of the transmission white list 31a_1.

Figure 6:
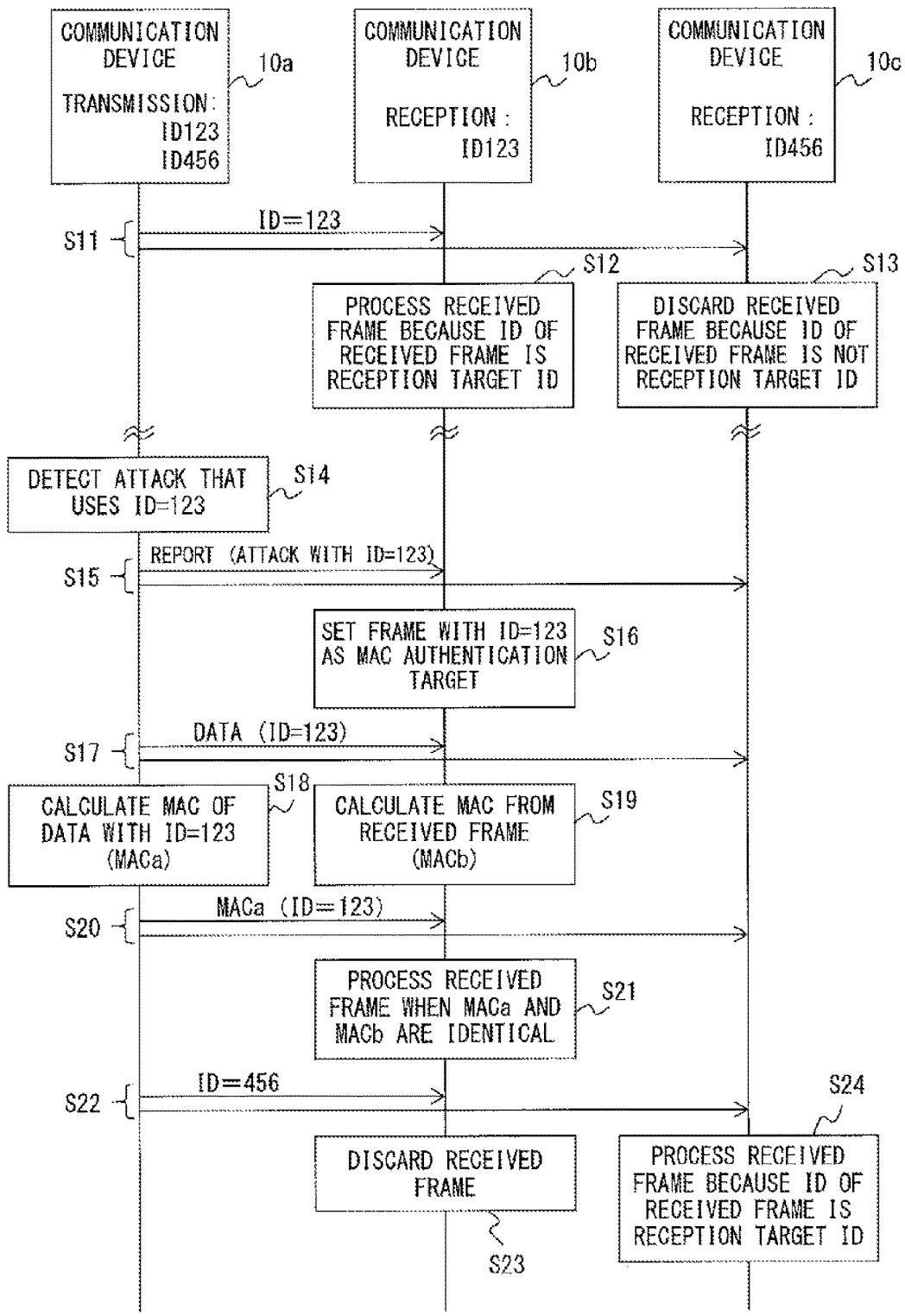
FIG. 6 is a sequence diagram that illustrates an example of communication processing.

FIG. 6 is a sequence diagram that illustrates an example of communication processing. FIG. 7 illustrates examples of updating a table and an example of a report frame when an attack has been detected. An example of communication performed when the communication devices 10a to 10c respectively hold pieces of information illustrated in FIG. 5 is described below with reference to FIGS. 6 and 7.

It is assumed that, in Step S11, the communication device 10a transmits a frame including ID=123. The frame transmitted from the communication device 10a is broadcast in the network, so the frame including ID=123 reaches both of the communication devices 10b and 10c.

When a receiver 12b of the communication device 10b receives the frame including ID=123, the receiver 12b outputs the received frame to an attack detector 21b. The ID of the received frame is included in the reception white list 32b_1 (FIG. 5), so the attack detector 21b determines that the ID in the received frame is an ID that identifies a frame to be received. Further, in the reception white list 32b_1, the authentication flag associated with ID=123 is set to OFF. Thus, the attack detector 21b outputs the received frame to a frame processing unit 26b, and the frame processing unit 26b processes the received frame (Step S12).

Also in the communication device 10c, when a receiver 12c receives the frame including ID=123, the receiver 12c outputs the received frame to an attack detector 21c. The ID of the received frame is not included in the reception white list 32c (FIG. 5), so the attack detector 21c determines that the ID in the received frame is not an ID that identifies a frame to be received, and discards the received frame (Step S13).

As described with reference to Steps S11 to S13, unless an attack using a frame including ID=123 is detected, authentication processing is not performed upon transmitting and receiving a frame including ID=123. It is assumed that, after that, an attack using ID=123 has been detected in the communication device 10a (Step S14). Any well-known method may be used as a method for detecting an attack, but it is assumed that, in the example of FIG. 6, the frame with ID=123 is transmitted from the communication device 10d (not illustrated) to the communication device 10a. In this case, the attack detector 21a in the communication device 10a obtains the received frame with ID=123 through a receiver 12a, and compares the ID in the frame with the IDs in the reception black list 33a (FIG. 5). The reception black list 33a includes ID=123 included in the received frame, so the attack detector 21a determines that an attack on the network has been detected. A setting unit 22a sets, to ON, the authentication flag associated with the ID for which an attack has been detected.

A transmission white list 31a_2 of FIG. 7 represents examples of an updating of the transmission white list 31a_1 (FIG. 5) performed in the process of Step S14. In the process of Step S14, the setting unit 22a updates the authentication flag associated with ID=123. Thus, in the transmission white list 31a_2, the authentication flag associated with ID=123 from among the transmission target IDs is set to ON.

On the other hand, a report processing unit 25a of the communication device 10a generates a report frame reporting that an attack on ID=123 has occurred. Ml of FIG. 7 represents an example of an information element included in the report frame. The report frame includes a type of frame and an ID to be reported. In a report frame which is generated upon detecting an attack in Step S14, "type=report frame" and "target ID=123" are set. The information element represented in Ml is included in a data field of the frame. The report processing unit 25a transmits the generated report frame to the communication devices 10 in the network through a transmitter 13a (Step S15 of FIG. 6). It is assumed that the report frame is transmitted using an ID for control that is to be received by all of the communication devices 10 in the network. Thus, the report frame reaches both of the communication devices 10b and 10c. Further, an ID that is to be received by all of the ECUs dedicated to a report frame may be used so as to not store the type of information in a data field.

When the attack detector 21b obtains a report frame through the receiver 12b, the attack detector 21b of the communication device 10b outputs the report frame to a setting unit 22b. The setting unit 22b determines whether the target ID in the report frame is recorded in one of a transmission white list 31b and a reception white list 32b. In this example, target ID=123, and ID=123 is included in the reception white list 32b_1 (FIG. 5). Thus, the setting unit 22b sets, to ON, the authentication flag associated with ID=123 in the reception white list 32b_1 (FIG. 5), so as to set the frame with ID=123 to be a MAC authentication target (Step S16). In the process of Step S16, the reception white list 32b_1 has been updated as indicated by a reception white list 32b_2 (FIG. 7).

Also in the communication device 10c, the attack detector 21c obtains a report frame through the receiver 12c, and outputs the report frame to a setting unit 22c. The setting unit 22c determines whether the target ID in the report frame is recorded in one of a transmission white list 31c and a reception white list 32c. It is assumed that target ID=123 is not included in the reception white list 32c (FIG. 5) or the transmission white list 31c. Thus, the setting unit 22c determines that the ID for which a start of authentication processing has been reported by the report frame is not an ID that identifies a frame to be processed in the communication device 10c, and discards the report frame.

It is assumed that, after that, a frame processing unit 26a of the communication device 10a generates a transmission frame including ID=123. The frame processing unit 26a outputs the generated frame to a determination unit 27a. The determination unit 27a searches in the transmission white list 31a_2 (FIG. 7) using ID=123 in the generated frame as a key, so as to determine whether it is a frame which can be transmitted. The transmission white list 31a_2 includes ID=123, so the determination unit 27a determines that a transmission frame which can be transmitted has been generated. Further, the authentication flag associated with ID=123 is set to ON in the transmission white list 31a_2, so the determination unit 27a determines that the frame to be transmitted is a frame on which authentication processing is to be performed upon transmitting and receiving the frame. Thus, the determination unit 27a outputs the transmission frame to the transmitter 13a and a MAC generator 23a. The transmitter 13a transmits the input transmission frame to the network (Step S17).

Figure 8:
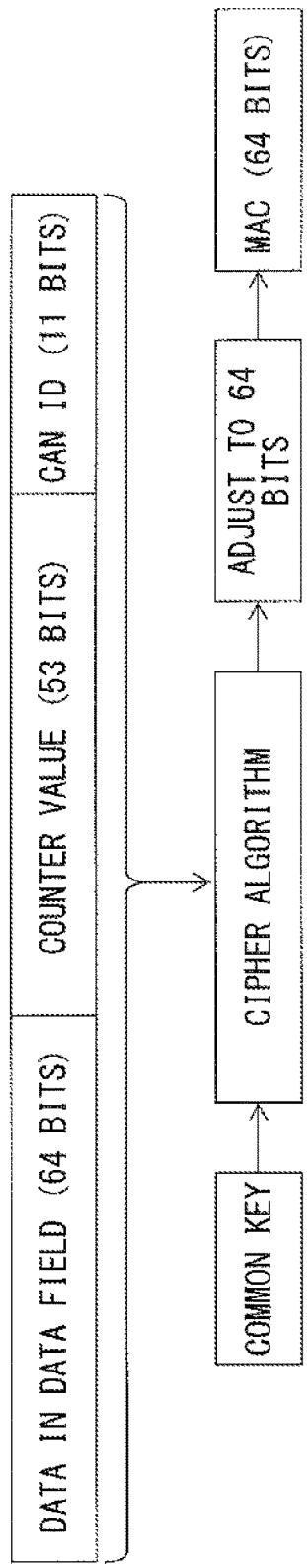
FIG. 8 is a diagram that explains an example of a method for generating a MAC.

The MAC generator 23a generates a MAC for authentication using the input frame. The method for generating a MAC for authentication will be described later (FIG. 8). In the example of FIG. 6, the MAC generated from the frame with ID=123 transmitted in Step S17 is MACa (Step S18).

In the communication device 10b which the frame with ID=123 transmitted in Step S17 has reached, the attack detector 21b obtains the frame with ID=123 through the receiver 12b. Using the reception white list 32b_2 (FIG. 7), the attack detector 21b determines that the frame with ID=123 is to be received. Further, the authentication flag associated with ID=123 is set to ON, so the attack detector 21b determines that a MAC authentication is to be performed upon receiving the frame with ID=123, and outputs the frame with ID=123 to an authentication unit 24b. The authentication unit 24b makes a request for a MAC generator 23b to generate a MAC using the input frame. In response to the request made by the authentication unit 24b, the MAC generator 23b generates a MAC (Step S19). In the example of FIG. 6, the MAC calculated from the frame with ID=123 which has reached the communication device 10b is MACb. The method for generating a MAC in the MAC generator 23b is similar to the method for generating a MAC in the MAC generator 23a.

The frame with ID=123 transmitted in Step S17 also reaches the communication device 10c, but the frame with ID=123 is not to be received or transmitted by the communication device 10c. Thus, the frame with ID=123 is discarded in the communication device 10c by the process similarly to that of Step S13.

After that, the MAC generator 23a of the communication device 10a transmits the MAC (MACa) calculated in Step S18 as information used to authenticate the frame with ID=123 transmitted in Step S17 (Step S20).

In the communication device 10b which the frame with ID=123 transmitted in Step S20 has reached, the received frame is output to the authentication unit 24b, in a procedure similar to the procedure performed when the communication device 10b received the data frame with ID=123 in Step S17. The authentication unit 24b extracts, from the input frame, MACa generated in a transmission source of the frame with ID=123 (the communication device 10a), and compares it with a result of calculation in the MAC generator 23b (MACb). When MACa and MACb are identical, the authentication unit 24b outputs data in the data frame received in Step S17 to the frame processing unit 26b. Thus, the received frame is processed in the communication device 10b (Step S21). When MACa and MACb are not identical, the authentication unit 24b discards the data frame received in Step S17 and the information for authentication received in Step S20.

It is assumed that, after that, in Step S22, the frame processing unit 26a in the communication device 10a generates a frame including ID=456. The determination unit 27a searches in the transmission white list 31a_2 (FIG. 7) using ID=456 in the generated frame as a key, so as to determine whether it is a frame which can be transmitted. The transmission white list 31a_2 includes ID=456, so the determination unit 27a determines that a transmission frame which can be transmitted has been generated. Further, the authentication flag associated with ID=456 in the transmission white list 31a_2 is set to OFF, so the determination unit 27a determines that the frame to be transmitted is not a frame on which authentication processing is to be performed upon transmitting and receiving the frame. Thus, the determination unit 27a transmits the transmission frame to the network through the transmitter 13a (Step S22).

When it receives the frame including ID=456, the receiver 12b of the communication device 10b outputs the received frame to the attack detector 21b. The attack detector 21b discards the received frame because the ID of the received frame is not included in the reception white list 32b_2 (FIG. 7) or the transmission white list 31b (Step S23).

Also in the communication device 10c, when the receiver 12c receives the frame including ID=456, the receiver 12c outputs the received frame to an attack detector 21c. The attack detector 21c searches in the reception white list 32c (FIG. 5) using ID=456 of the received frame as a key. ID=456 is included in the reception target ID and authentication flag=OFF, so the attack detector 21c determines that the frame identified by ID=456 is to be received without performing authentication processing. Thus, the attack detector 21c outputs the received frame with ID=456 to a frame processing unit 26c. Thus, the frame with ID=456 is processed in the communication device 10c (Step S24).

As described above, in the example of FIG. 6, authentication processing is performed upon transmitting and receiving a frame after a report frame is transmitted in Step S15 with respect to the frame with ID=123 for which an attack has been detected. On the other hand, even after an attack using ID=123 has been detected, an attack due to ID=456 is not detected. Thus, with respect to ID=456, a frame is transmitted and received without performing authentication processing in the processes of and after Step S22.

The processing described with reference to FIGS. 5 to 7 is just an example, and an input destination or an output destination of data may be changed depending on implementation of a program or hardware. For example, the MAC generator 23 may obtain data (CAN data) used to generate a MAC without passing through the authentication unit 24.

(2) Example of Method for Generating MAC

FIG. 8 is a diagram that explains an example of a method for generating a MAC. A scheme that uses a hash function such as HMAC-SHA1 (hash-based message authentication code—secure hash algorithm 1) or HMAC-SHA256 or a scheme that uses a block cipher algorithm may be used as the method for generating a MAC. An example of using a block cipher algorithm is described below with reference to FIG. 8, but any method may be used as the method for generating a MAC if it is common to the communication devices 10 in the network.

A character string obtained by combining data in a data field of a frame for which a MAC is to be calculated, a counter value, and an ID for which a MAC is to be calculated (CAN ID) is used to generate a MAC. Here, the counter value is a value processed in the MAC generator 23 such that a different value is used every time a MAC is calculated for one ID. The counter value may be a different value for each ID, or it may be an identical value. In the example of FIG. 8, a character string in which the data, the counter value, and the CAN ID are consecutively placed in this order is generated, but the order of the combined elements may be changed depending on implementation. Next, the MAC generator 23 encrypts the character string obtained from the data, the counter value, and the CAN ID using a common key, so as to generate a cypher text. The MAC generator 23 selects 64 bits from the cipher text by a predetermined method, so as to use an obtained value as a MAC. Any method may be used as a method for selecting 64 bits if it is common to the communication devices 10 in the network. For example, the MAC generator 23 may use the 64 bits at the beginning of a generated cipher text as a MAC, or it may use the 64 bits at the end of the cipher text as a MAC. Further, the length may be adjusted to a length other than 64 bits depending on security.

(3) Example of Method for Detecting Attack

Figure 9:
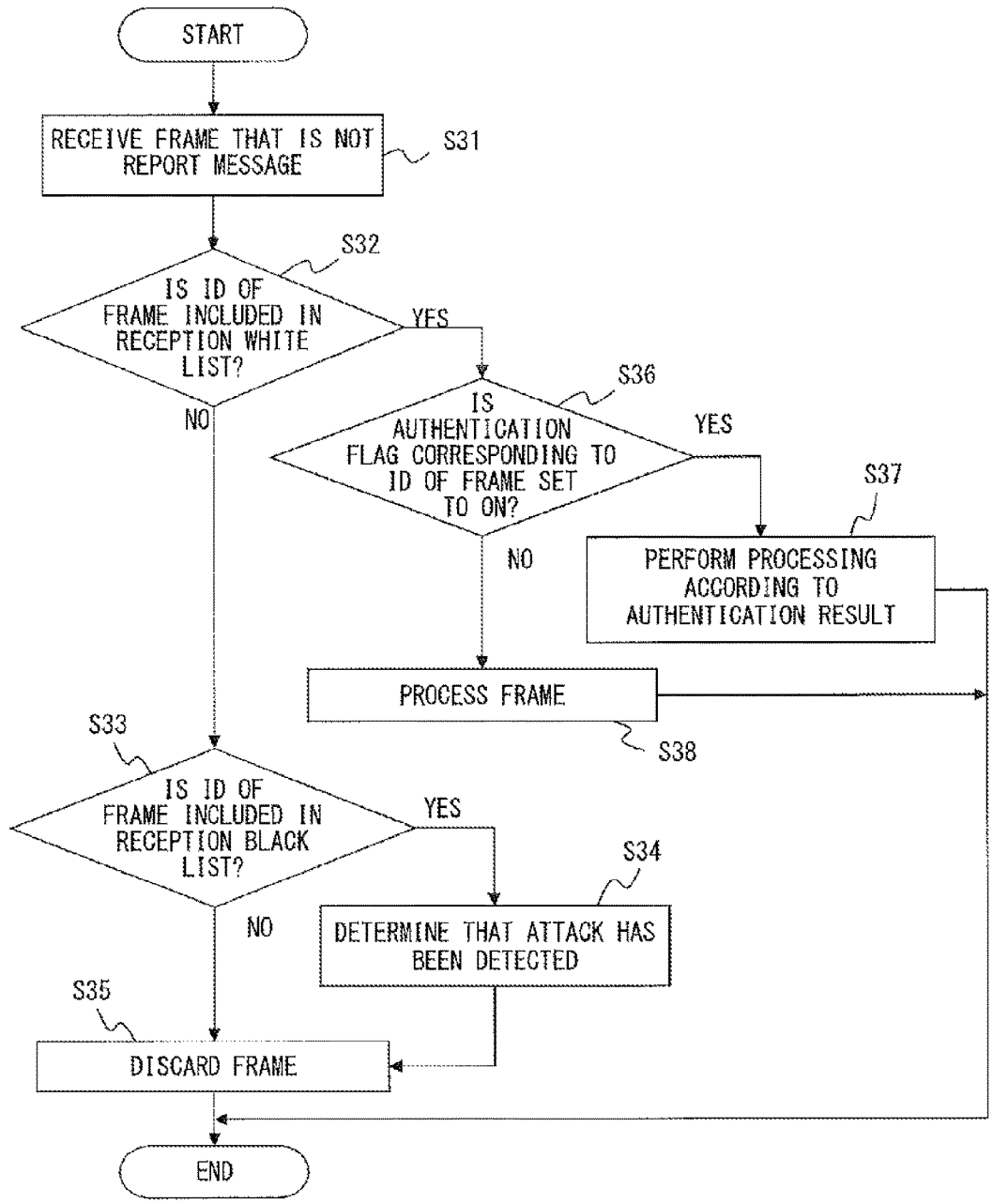
FIG. 9 is a flowchart that illustrates an example of a method for detecting an attack.

FIG. 9 is a flowchart that illustrates an example of a method for detecting an attack. Referring to FIG. 9, an example of a method for the communication device 10 detecting an attack using a frame other than a report frame is described, as is the case with the processing described with reference to FIGS. 5 to 7.

It is assumed that the receiver 12 of the communication device 10 has received a frame that is not a report message (Step S31). The receiver 12 outputs the received frame to the attack detector 21. The attack detector 21 determines whether an ID that identifies the input frame is included in the reception white list 32 (Step S32). When the ID that identifies the input frame is not included in the reception white list 32, the attack detector 21 determines whether the ID that identifies the input frame is included in the reception black list 33 (No in Step S32, Step S33). When the ID that identifies the input frame is included in the reception black list 33, the attack detector 21 determines that an attack has been detected (Yes in Step S33, Step S34). Then, the attack detector 21 outputs the ID used to identify the input frame to the setting unit 22, and discards the input frame (Step S35).

On the other hand, when the ID that identifies the input frame is also not included in the reception black list 33, the attack detector 21 determines that the input frame is not to be processed (No in Step S33). Then, the attack detector 21 discards the input frame (Step S35).

When the ID that identifies the input frame is included in the reception white list 32, the attack detector 21 determines whether the authentication flag associated with the ID of the frame is set to ON (Yes in Step S32, Step S36). When the authentication flag associated with the ID of the frame is not set to ON, the attack detector 21 outputs the input frame to the frame processing unit 26 (No in Step S36). The frame processing unit 26 processes the input frame (Step S38). On the other hand, when the authentication flag associated with the ID of the frame is set to ON, the attack detector 21 outputs the input frame to the authentication unit 24 (Yes in Step S36). The authentication unit 24 performs authentication processing on the input frame using a MAC calculated from data in the input frame and a MAC obtained from a transmission source to use for authenticating the input frame, and performs processing according to a result of the authentication (Step S37).

An attack may also be detected in the cases other than when a communication device 10 receives, from another communication device 10, an ID that is identical to the ID of the frame that is to be transmitted by the communication device 10 itself. For example, the attack detector 21 is able to record a reception cycle or a reception frequency of a frame for each ID included in the reception white list 32. When the variation rate of the reception cycle of a frame is greater than a predetermined amount, the attack detector 21 may determine that an attack has been detected. Likewise, when the reception frequency of a frame exceeds a predetermined amount, the attack detector 21 may also determine that an attack has occurred. Processing performed after it is determined that an attack has occurred is similar to the processing described with reference to FIGS. 5 to 7.

Further, the communication device 10 also determines that an attack has occurred when the determination unit 27 has detected that an ID that identifies a frame to be transmitted is not included in the transmission white list 31. Such processing is particularly effective, for example, when a frame is processed at a connection destination of a communication device 10, for reasons such as the communication device 10 being implemented as the CAN controller 102. In other words, if a connection-destination device of the communication device 10 is replaced by an attacker, a malicious frame will be input to the communication device 10 as a transmission frame. Thus, when it detects a frame that includes, as identification information, an ID that is not included in the transmission white list 31, the determination unit 27 may determine that it has detected an attack. In parallel with discarding of a frame used to detect an attack, the determination unit 27 reports to the report processing unit 25 about the ID in the frame to be discarded. Processing for transmission of a report frame performed in the report processing unit 25 and processing performed in the communication device 10 that has received the report frame are similar to those described with reference to FIGS. 5 to 7.

(4) Example of Method for Implementing with Hardware

An example in which the processing performed in the communication device 10 is performed by a processor by which a program has been read has been used when the processing has been described with reference to FIGS. 5 to 9, but a portion of or the entirety of processing performed in the communication device 10 may be realized by hardware. An example of controlling a switching of authentication processing and a transmission of a report frame by using a switch is described below.

FIG. 10 is a diagram that explains an example of processing performed when an attack has been detected. An example in which report-frame transmitting processing is controlled by a switch SW1 is described with reference to the communication device 10*a* of FIG. 10. In the case of the communication device 10*a* in FIG. 10, the switch SW1 is installed to connect between a storage 30*a* and the report processing unit 25*a*, and the setting unit 22*a*. Further, it is assumed that, unless an attack has been detected, the switch SW1 remains set in a state in which a signal from the setting unit 22*a* does not flow into, for example, the report processing unit 25*a*. It is assumed that, for example, the communication device 10*a* has detected an attack in this state using a received frame. It is assumed that, from among the above-described methods, any of the methods which use a received frame may be used as a method for detecting an attack. The attack detector 21*a* outputs, to the setting unit 22*a*, information on an ID used to identify a received frame (arrow A1). The setting unit 22*a* is connected to the report processing unit 25*a* and the storage 30*a* using the switch SW1 (change in the setting of the SW1 in arrow A2). Further, when the setting unit 22*a* and the report processing unit 25*a* are connected to each other, a signal output from the setting unit 22*a* is input to the report processing unit 25*a* (arrow A3). When the report processing unit 25*a* obtains, from the setting unit 22*a*, an ID for which an attack has been detected, the report processing unit 25*a* generates a report frame and outputs it to the transmitter 13*a* (arrow A4). The transmitter 13*a* transmits the report frame to the other devices. On the other hand, in the transmission white list 31*a* or a reception white list 32*a* included in the storage 30*a*, the setting unit 22*a* sets, to ON, the authentication flag associated with the ID for which an attack has been detected (arrow A5).

An example of a control performed when a report frame transmitted from the communication device 10*a* has been received is described in the communication device 10*b* of FIG. 10. The case in which an authentication flag associated with an ID in the reception white list 32 is realized as a switch SW2 is described with reference to the communication device 10*b* of FIG. 10. When the authentication flag is realized as a switch SW2, a data output unit 43 used to control an output of data is installed along with the switch SW2 with respect to each ID to be processed by the communication device 10. The switch SW2 is also installed for each ID. In the example of the communication device 10*b* of FIG. 10, a portion that is used to process an ID on which an attack has been reported by a report frame is extracted and illustrated. For example, the attack detector 21*b* or the like may be connected between the receiver 12*b* and the frame processing unit 26*b* or the authentication unit 24*b*.

Before a report frame is received, the switch SW2 is set such that a signal that represents "Yes" is constantly output to a data output unit 43*b*, as indicated by a dashed line A. When the signal "Yes" is output to the data output unit 43*b*, the data output unit 43*b* outputs, to the frame processing unit 26*b*, data in a frame obtained through, for example, the receiver 12*b* or the attack detector 21*b* (not illustrated) (arrows A11, A12). It is assumed that data in a data frame (CAN data) is input to the MAC generator 23*b* (arrow A13). It is also assumed that MAC data transmitted when a MAC authentication is performed is input to the authentication unit 24*b* (arrow A14). The MAC generator 23*b* generates a MAC using the input CAN data and outputs the generated MAC to the authentication unit 24*b* (arrow A15). When a MAC authentication is not performed, MAC data is not input to the authentication unit 24*b*, so processing of comparing a result of a calculation of a MAC performed in the MAC generator 23*b* with the MAC data for authentication obtained by the authentication unit 24*b* is not performed.

When a report frame is received, the setting of the switch SW2 associated with an ID reported by the report frame is changed by the setting unit 22*b* (not illustrated), as indicated by a solid line B. In the setting indicated by the solid line B, an authentication result is output from the authentication unit 24*b* to the switch SW2 (arrow A16). Thus, when the authentication result is that the authentication has been successful (Yes), the signal "Yes" is output from the switch SW2 to the data output unit 43*b*, but when the authentication has not been successful, a signal "No" is output from the switch SW2 to the data output unit 43*b*. When "No" is output, indicating that the authentication has not been successful, the data output unit 43*b* discards data obtained by itself and does not output it to the frame processing unit 26*b*.

Thus, CAN data is output to the frame processing unit 26b only when authentication processing has been performed successfully.

Figure 11:
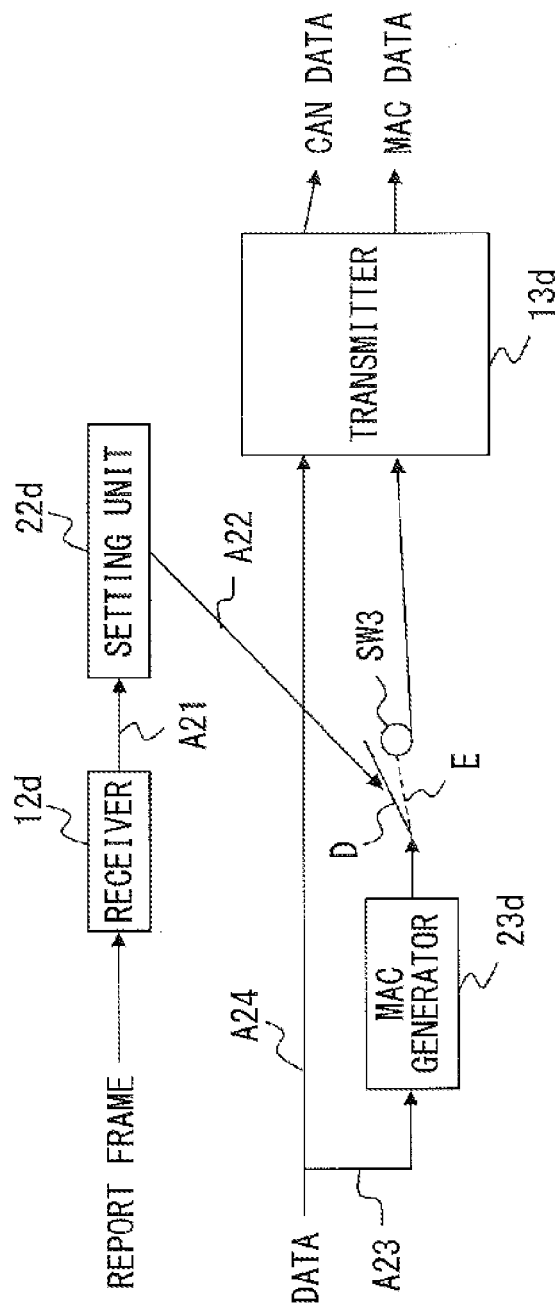
FIG. 11 is a diagram that explains an example of processing performed when an attack has been detected.

FIG. 11 is a diagram that explains an example of processing performed when an attack has been detected. The case in which an authentication flag associated with an ID in the transmission white list 31 is realized as a switch SW3 is described with reference to FIG. 11. When the authentication flag is realized as a switch SW3, the switch SW3 is installed to connect between the MAC generator 23d and the transmitter 13d. It is assumed that one switch SW3 is installed for each ID that is a transmission target of the communication device 10d. Also in the example of FIG. 11, a portion that is used to process an ID on which an attack has been reported by a report frame is extracted and illustrated.

Before a report frame is received, the switch SW3 is set as indicated by a solid line D, so the MAC generator 23d and the transmitter 13d are not connected to each other. Thus, even if a MAC is generated in the MAC generator 23d, the generated MAC is not output to the MAC generator 23d because the switch SW3 is not pressed down.

A setting unit 22d obtains a report frame through a receiver 12d or an attack detector 21d (not illustrated) (arrow A21). The setting unit 22d changes the setting of the switch SW3 associated with an ID reported by the report frame, as indicated by a dashed line E. Thus, after the setting has been changed, a MAC generated in the MAC generator 23d is output to the transmitter 13d. When data (CAN data) is generated in the frame processing unit 26 after the change in the setting of the switch SW3, CAN data to be reported is input to both the transmitter 13d and the MAC generator 23d (arrows A23,A24). When the setting of the switch SW3 corresponds to authentication flag=ON, MAC data generated in the MAC generator 23d is output to the transmitter 13d. Thus, with respect to an ID for which an attack has been detected by a report frame, both CAN data and MAC data are transmitted from the transmitter 13d after the attack has been reported.

Figure 12:
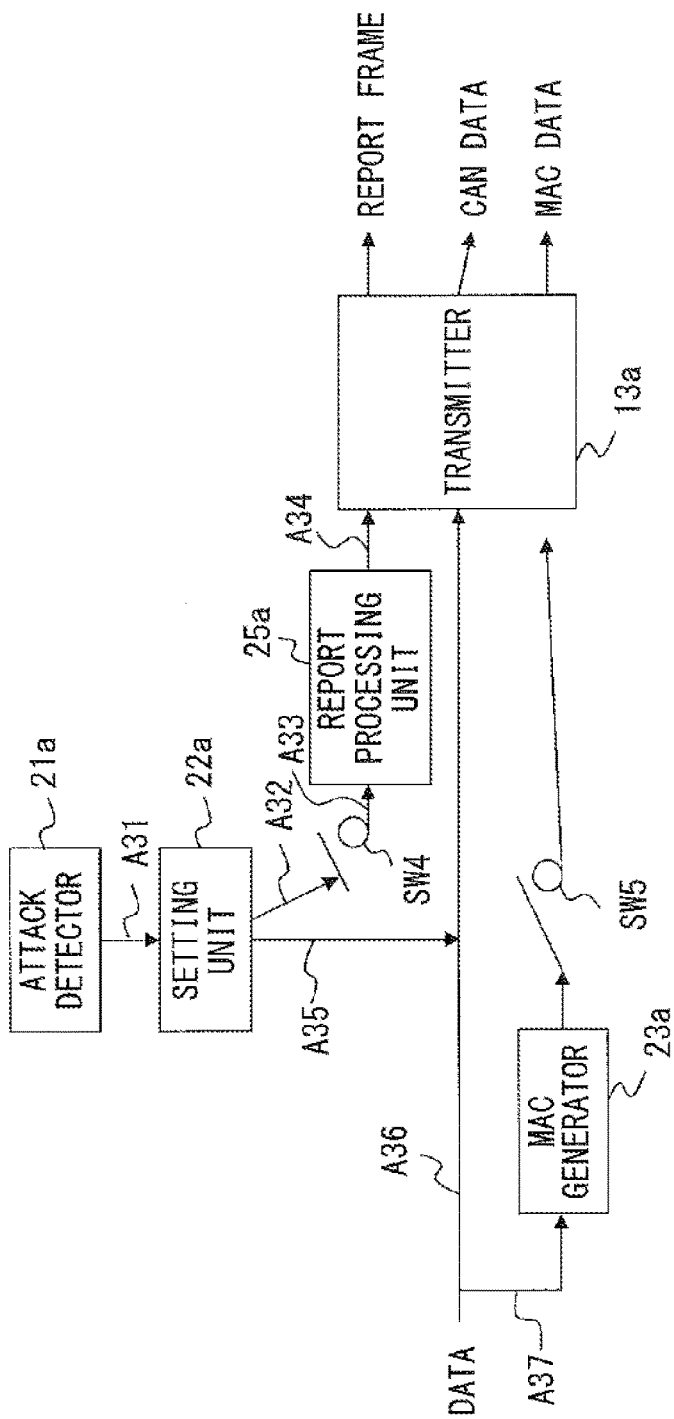
FIG. 12 is a diagram that explains an example of processing performed when an attack has been detected.

FIG. 12 is a diagram that explains an example of processing performed when an attack has been detected. An example in which both a control of report-frame transmitting processing and an authentication flag in the transmission white list 31 are realized by switches is described with reference to FIG. 12. In FIG. 12, the report-frame transmitting processing is controlled by a switch SW4, and the authentication flag in the transmission white list 31 is realized by a switch SW5. The switch SW4 is installed to connect between the report processing unit 25a and the setting unit 22a, and unless an attack has been detected, the switch SW4 remains set in a state in which a signal from the setting unit 22a does not flow into the report processing unit 25a. It is assumed that the communication device 10a has detected an attack in this state using a received frame. The attack detector 21a outputs, to the setting unit 22a, information on an ID used to identify a frame used to perform an attack (arrow A31). The setting unit 22a is connected to the report processing unit 25a using the switch SW4 (change in the setting of the SW4 in arrow A32). Further, when the setting unit 22a and the report processing unit 25a are connected to each other, a signal output from the setting unit 22a is input to the report processing unit 25a (arrow A33). When the report processing unit 25a obtains, from the setting unit 22a, an ID for which an attack has been detected, the report processing unit 25a generates a report frame and outputs it to the transmitter 13a (arrow A34). The transmitter 13a transmits the report frame to the other devices.

On the other hand, the switch SW5 that operates as an authentication flag and is installed to connect between the MAC generator 23a and the transmitter 13a. It is assumed that one switch SW5 is installed for each ID that is a transmission target of the communication device 10a. The MAC generator 23a is disconnected from the transmitter 13a by the switch SW5 before a report frame is received.

When an ID for which an attack has been detected is reported from the attack detector 21a, the setting unit 22a changes the setting of the switch SW5 associated with the reported ID so as to connect the MAC generator 23a to the transmitter 13a (arrow A35). Thus, after the setting has been changed, a MAC generated in the MAC generator 23a is output to the transmitter 13a. When data (CAN data) is generated in the frame processing unit 26a after the change in the setting of the switch SW5, CAN data to be reported is input to both the transmitter 13a and the MAC generator 23a (arrows A36, A37). When the setting of the switch SW5 corresponds to authentication flag=ON, MAC data generated in the MAC generator 23a is output to the transmitter 13a. Thus, with respect to an ID for which an attack has been detected by a report frame, both CAN data and MAC data are transmitted after the attack has been reported.

Figure 13:
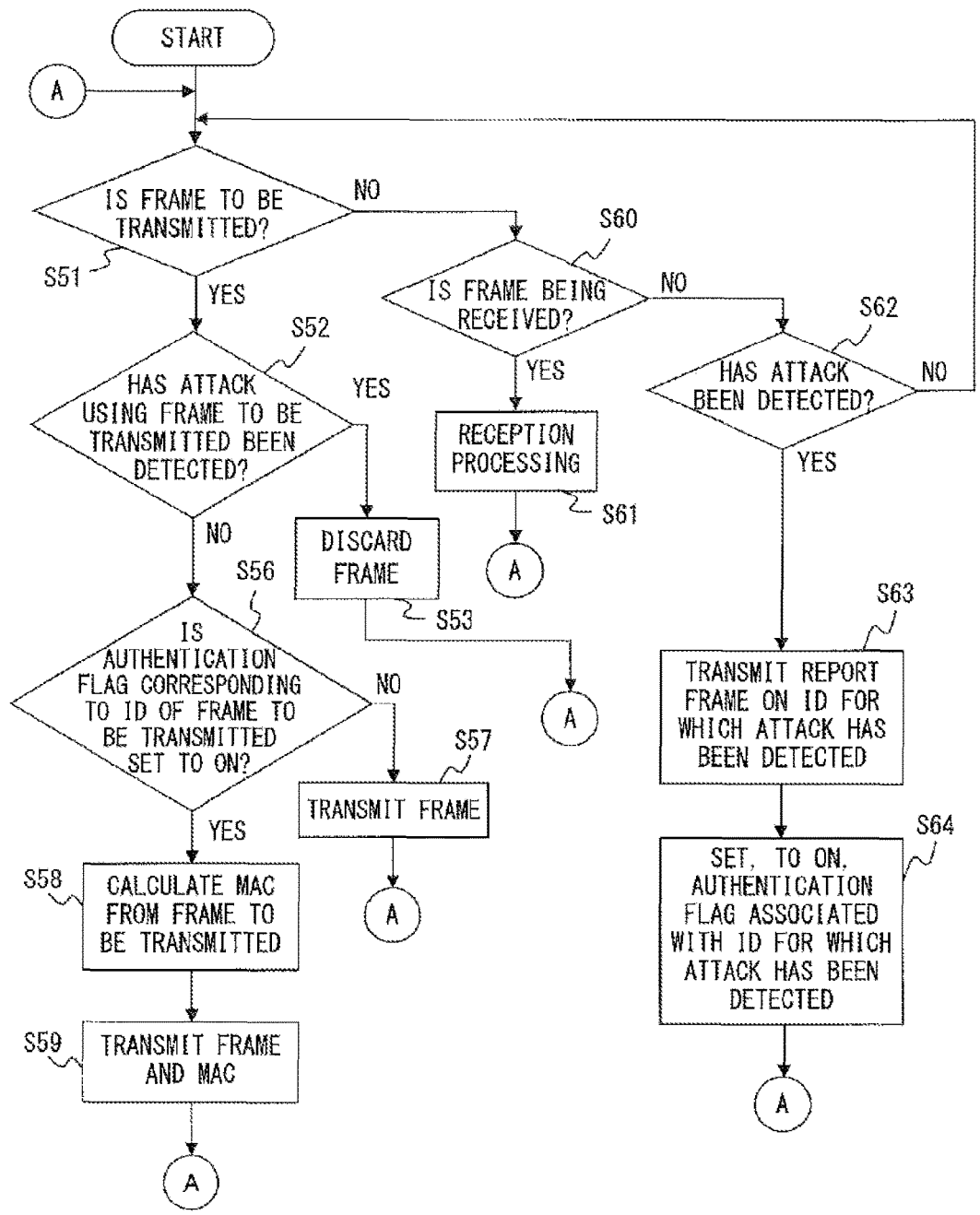
FIG. 13 is a flowchart that illustrates an example of processing performed by the communication device.

FIG. 13 is a flowchart that illustrates an example of processing performed by the communication device 10. The determination unit 27 in the communication device 10 determines whether a frame is to be transmitted (Step S51). When the frame is to be transmitted, the determination unit 27 determines whether an attack using the frame to be transmitted has been detected (Step S52). For example, the determination unit 27 may perform, as the process of Step S52, determination of whether an ID that identifies a transmission frame is included in the reception white list 31. When an attack using the frame to be transmitted has been detected, the determination unit 27 discards the frame to be processed (Step S53).

When an attack using the frame to be transmitted has not been detected, the determination unit 27 determines whether the authentication flag associated with the frame to be transmitted is set to ON (No in Step S52, Step S56). When the authentication flag associated with the frame to be transmitted is set to OFF, the determination unit 27 transmits, through the transmitter 13, the frame to be transmitted (No in Step S56, Step S57). On the other hand, when the authentication flag associated with the frame to be transmitted is set to ON, the MAC generator 23 calculates a MAC from the frame to be transmitted (Yes in Step S56, Step S58). The transmitter 13 transmits the frame to be transmitted and the MAC calculated in the MAC generator 23 (Step S59).

When it is determined that frame-transmitting processing is not to be performed in Step S51, it is determined whether frame-receiving processing is being performed (No in Step S51, Step S60). When the frame-receiving processing is being performed, the communication device 10 performs frame-receiving processing (Yes in Step S60, Step S61). The process of Step S61 is described in detail with reference to FIG. 14.

On the other hand, when the frame-receiving processing is also not being performed, the attack detector 21 determines whether an attack has been detected (No in Step S60, Step S62). When the attack detector 21 has not detected an attack, the process returns to Step S51 (No in Step S62). When the attack detector 21 has detected an attack, the report processing unit 25 transmits a report frame on an ID for which an attack has been detected (Yes in Step S62, Step S63). The setting unit 22 sets, to ON, the authentication flag associated with the ID for which an attack has been detected by the attack detector 21 (Step S64). When the processes of Steps S53, S57, S59, and S64 are terminated, the processes of and after Step S51 are repeated.

FIG. 13 is just an example, and the procedure may be changed depending on implementation. For example, the order of Steps S63 and S64 may be changed discretionally. Further, the communication device 10 may be designed such that the processes of Steps S63 and S64 are performed after the process of Step S53. For example, when the determination unit 27 has detected that an ID of a frame to be transmitted is an ID that is not included in the reception white list 31, the processes of Steps S63 and S64 may be performed after the process of Step S53.

Figure 14:
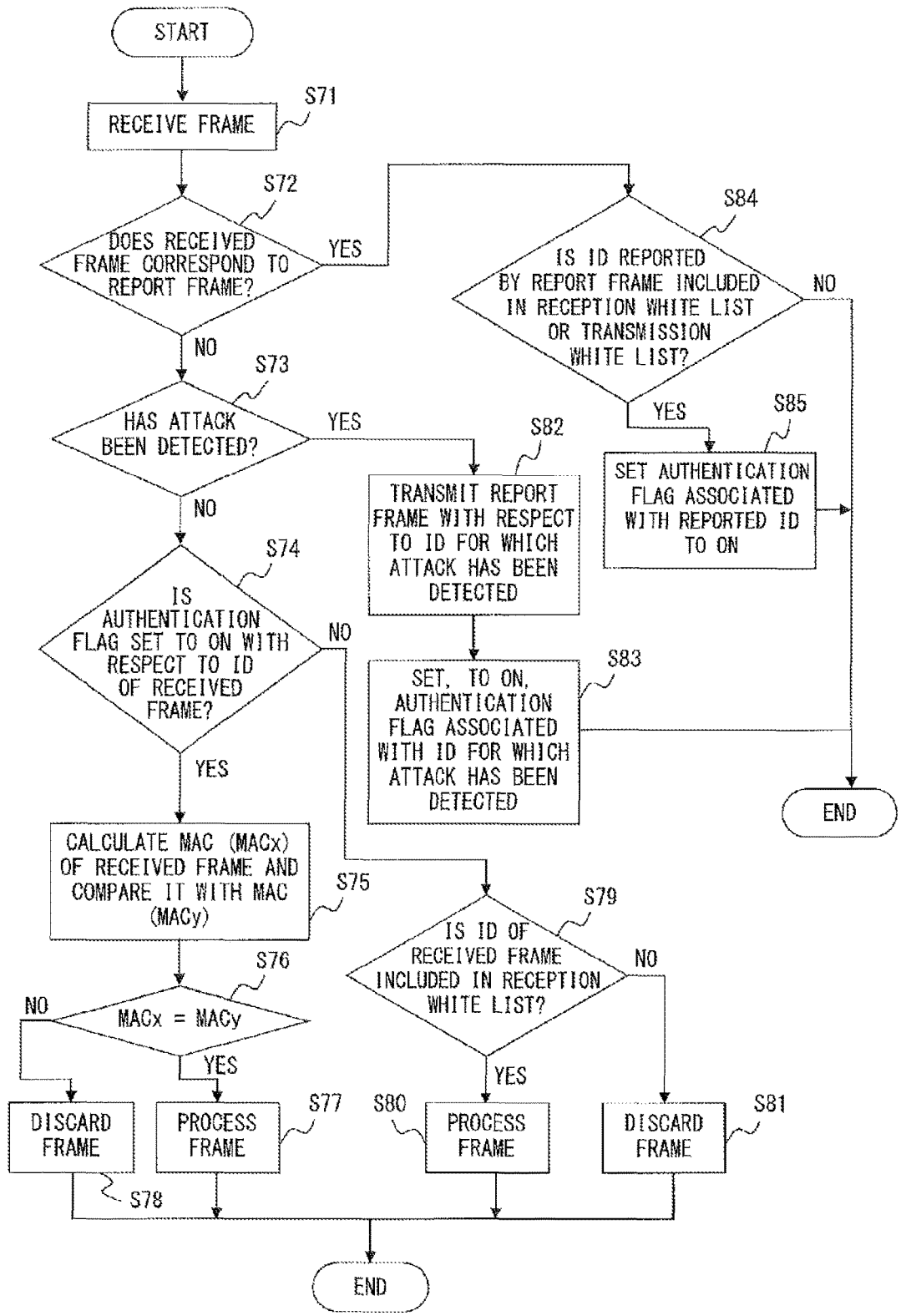
FIG. 14 is a flowchart that illustrates an example of processing performed when the communication device has received a frame.

FIG. 14 is a flowchart that illustrates an example of processing performed when the communication device 10 has received a frame. FIG. 14 illustrates an example of the process of Step S61 in FIG. 13 in detail. FIG. 14 also illustrates an example of the process, and it may be changed depending on implementation. For example, the order of Steps S82 and S83 may be changed discretionally.

The receiver 12 receives a frame (Step S71). The attack detector 21 determines whether the received frame is a report frame (Step S72). When the received frame is not a report frame, the attack detector 21 determines whether an attack has been detected using the received frame (No in Step S72, Step S73). The processing described with reference to FIG. 9 may be performed as the determination processing in Step S73. When an attack has not been detected using the received frame, the attack detector 21 determines whether the authentication flag associated with the ID of the received frame is set to ON (No in Step S73, Step S74). When the authentication flag associated with the ID of the received frame has been set to ON, the MAC generator 23 calculates a MAC (MACx) from the received frame. Further, the authentication unit 24 compares the calculated MACx with a MAC received for authentication (MACy) (Yes in Step S74, Step S75). When MACx and MACy are identical, the authentication unit 24 outputs the received frame to the frame processing unit 26, and the frame processing unit 26 processes the frame (Yes in Step S76, Step S77). When MACx and MACy are not identical, the authentication unit 24 discards the received frame (No in Step 76, Step S78).

When the authentication flag associated with the ID of the received frame is not set to ON in Step S74, the received frame is a frame that is transmitted and received without authentication being performed (No in Step S74). The attack detector 21 determines whether the ID of the received frame is included in the reception white list 32 (Step S79). When the ID of the received frame is included in the reception white list 32, the attack detector 21 outputs the received frame to the frame processing unit 26, and the frame processing unit 26 processes the frame (Yes in Step S79, Step S80). On the other hand, when the ID of the received frame is not included in the reception white list 32, the attack detector 21 discards the received frame (No in Step S79, Step S81).

When it is determined that an attack has been detected in Step S73, the report processing unit 25 performs processing of transmitting a report frame on an ID for which an attack has been detected (Yes in Step S73, Step S82). The setting unit 22 sets, to ON, the authentication flag associated with the ID for which an attack has been detected (Step S83).

When it is determined that a report frame has been received in Step S72, the setting unit 22 determines whether an ID reported by the report frame is included in the reception white list 32 or the transmission white list 31 (Yes in Step S72, Step S73). When the ID reported by the report frame is not included in the reception white list 32 or the transmission white list 31, the setting unit 22 terminates the reception processing (No in Step S84). When the ID reported by the report frame is included in the reception white list 32 or the transmission white list 31, the setting unit 22 sets the authentication flag associated with the reported ID to ON (Yes in Step S84, Step S85).

As described above, according to the first embodiment, after an attack is detected by one of the communication devices 10 in the network, a MAC authentication is performed when communication is performed using an ID for which an attack has been detected so as to prevent an unauthorized access. Thus, the first embodiment permits an enhancement of security in the network. Further, a MAC authentication is performed only on an ID for which an attack has been detected, so a load placed on a communication device 10 due to MAC authentication is lighter and a delay in performing processing is smaller, compared to when a system is used that performs a MAC authentication regardless of whether an attack has been detected. Further, there does not occur a problem in which, for example, the processing speed when a specific ID is used is slower than when a MAC authentication is performed regardless of whether an attack has been detected.

Second Embodiment

In addition to the first embodiment, the case in which transmission and reception of a frame that is performed using a MAC authentication is terminated because an attack has been terminated or processing performed on an attack has been successful is described.

Figure 15:
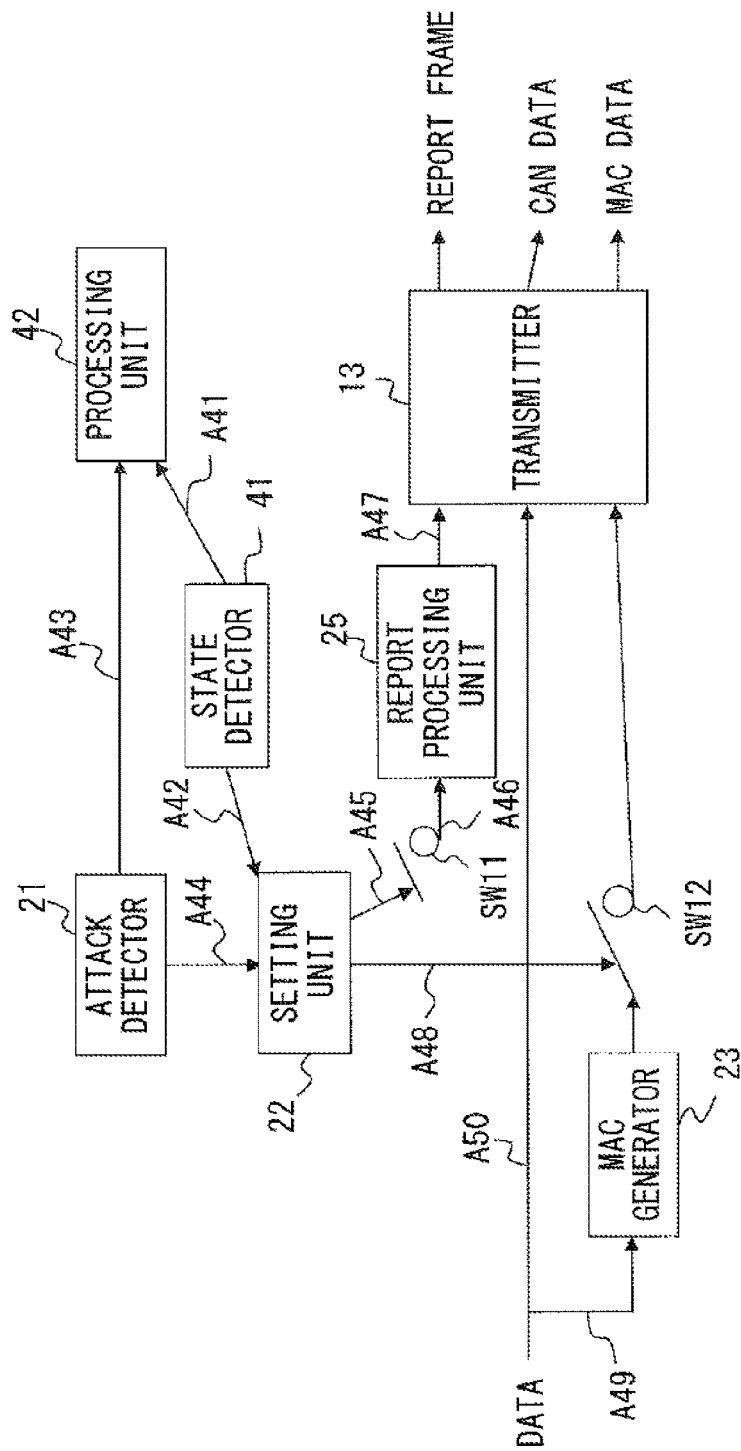
FIG. 15 is a diagram that explains an example of processing performed when an attack has been detected.

FIG. 15 is a diagram that explains an example of processing performed when an attack has been detected in a second embodiment. As illustrated in FIG. 15, the communication device 10 according to the second embodiment includes a state detector 41 and a processing unit 42. The state detector 41 monitors an operational status of a system installed in the network, and reports to the processing unit 42 and the setting unit 22 about obtained information. When the occurrence of an attack is reported from the attack detector 21, the processing unit 42 performs one of the predetermined processings according to the operational status of the system. Both the state detector 41 and the processing unit 42 are realized by the processor 104 or the processor 111. The operations of the state detector 41 and the processing unit 42 are described below with reference to FIG. 15. In FIG. 15, report-frame transmitting processing is controlled by a switch SW11, and the authentication flag in the transmission white list 31 is realized by a switch SW12. FIG. 15 illustrates an example of implementing, for example, an authentication flag with hardware, but also in the communication device 10 according to the second embodiment, a portion of or the entirety of the controller 20 may also be realized by software.

While the communication device 10 is awake, the state detector 41 performs processing to monitor an operation state in the system in which the network is installed. For example, the state detector 41 may determine an operational status using a result of communication performed with another state detector 41 included in another communication device 10 in the network or a result of communication performed with a device in the system in which the network is installed. For example, when a CAN network is provided in a vehicle, the state detector 41 monitors whether the vehicle provided with the CAN network is traveling. The state detector 41 outputs information obtained by performing monitoring processing to the setting unit 22 and the processing unit 42 periodically (arrows A41,A42).

It is assumed that, after that, an attack has been detected in the attack detector 21. Processing of detecting an attack in the attack detector 21 is similar to that in the first embodiment. The attack detector 21 reports to the processing unit 42 that an attack has been detected (arrow A43).

When an attack has been detected, the processing unit 42 performs predetermined processing for security measures. For example, when a CAN network is provided in a vehicle, upon being informed about an attack by the attack detector 21, the processing unit 42 may perform predetermined processing to output, from an in-car speaker, an audio signal that urges that the vehicle be stopped. Further, when there exists, for example, a display screen inside the vehicle, an image signal may be output to it. Furthermore, the processing unit 42 may inspect a state of a system using an inspection program held by the processing unit 42.

Processing indicated by arrows A44 to A47 is similar to the processing indicated by the arrows A31 to A34 described with reference to FIG. 12. Thus, similarly to the first embodiment, a report frame is also transmitted in the second embodiment. Further, processing indicated by arrows A48 to A50 is similar to the processing indicated by the arrows A35 to A37 described with reference to FIG. 12. Thus, similarly to the first embodiment, authentication processing is also performed in the second embodiment when a frame having an ID for which an attack has been reported by the report frame is transmitted and received.

Figure 16:
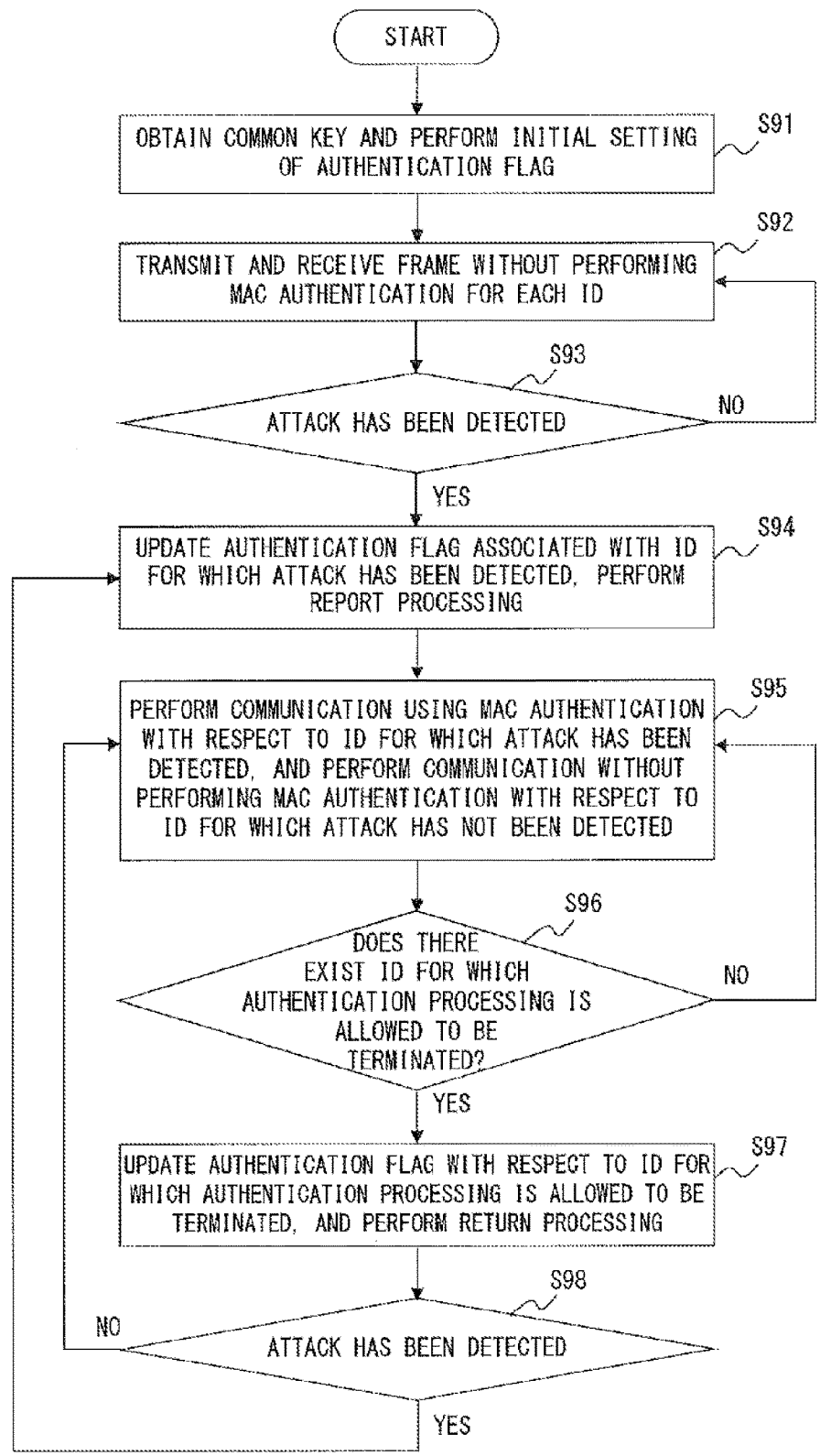
FIG. 16 is a flowchart that illustrates an example of a communication method according to a second embodiment.

FIG. 16 is a flowchart that illustrates an example of a communication method according to the second embodiment. An example of return processing is described below with reference to FIG. 16. Steps S91 to S95 of FIG. 16 are similar to Steps S1 to S5 described with reference to FIG. 1. In the second embodiment, while transmitting and receiving a frame for which a MAC authentication is used, the processing unit 42 determines whether there exists an ID for which authentication processing is allowed to be terminated, using information obtained from the state detector 41 or a result of an inspection performed by use of an inspection program (Step S96). For example, when it is reported, after an attack has been detected, by the state detector 41 that a vehicle stopped, the processing unit 42 may determine that authentication processing is allowed to be terminated with respect to all of the IDs on which authentication processing is performed. When it is confirmed that an attack using a specific ID has been terminated, the processing unit 42 determines that authentication processing is allowed to be terminated with respect to the ID for which it has been confirmed that an attack has been terminated.

When it determines that there exists an ID for which authentication processing is allowed to be terminated, the processing unit 42 reports to the setting unit 22 the ID for which authentication processing is allowed to be terminated. The setting unit 22 sets, to OFF, the authentication flag with respect to the ID reported by the processing unit 42. Then, the processing unit 42 generates a return requesting frame that makes a request for the other communication devices 10 to terminate authentication processing on the ID for which authentication processing performed by the communication device 10 of the processing unit 42 is allowed to be terminated. The return requesting frame includes a type of frame and an ID that makes a request to terminate authentication processing. For example, when return processing is performed with respect to ID=123, the processing unit 42 generates a return requesting frame that includes information elements below.

Type: Return requesting frame
Target ID: 123

The processing unit 42 transmits the generated return requesting frame from the transmitter 13. It is assumed that, like a report frame, the return requesting frame is also transmitted using an ID for control that is a reception target for all of the communication devices 10 in the network. Alternatively, instead of generating the return requesting frame, a frame that only includes a target ID may be generated so as to be transmitted using an ID dedicated to transmitting a return requesting frame.

In a communication device 10 that has received a return request, the attack detector 21 obtains a return requesting frame through the receiver 12. The attack detector 21 outputs the return requesting frame to the setting unit 22. The setting unit 22 sets, to OFF, the authentication flag associated with an ID reported by the received return requesting frame. Thus, authentication processing on the ID reported by the return requesting frame is not performed in the communication device 10 after the return requesting frame is received (Step S97). For example, after the return requesting frame is received, a communication device 10 which transmits a frame on which authentication processing was to be performed will not transmit a MAC of a frame to be transmitted upon transmitting a frame including the ID reported by the return requesting frame. On the other hand, after the return requesting frame is received, a communication device 10 which receives a frame on which authentication processing was to be performed will perform reception processing without performing authentication processing upon receiving a frame including the ID reported by the return requesting frame.

After that, each communication device 10 in the network determines whether a new attack has been detected (Step S98). When a new attack has not been detected, the processes of and after Step S95 are repeated (No in Step S98). Thus, with respect to an ID in which the setting "authentication flag=ON" remains unchanged, communication with authentication processing continues, but authentication processing is not performed with respect to an ID with "authentication flag=OFF". On the other hand, when a new attack has been detected, the processes of and after Steps S94 are repeated (Yes in Step S98). Thus, when a new attack has been detected, authentication processing starts to be performed on an ID for which an attack has been detected.

In the second embodiment, it is possible to terminate authentication processing when, for example, an attack is stopped. Thus, it is possible to start or stop authentication processing on the basis of, for example, the confirmation on a detection of an attack or a stop of an attack, which makes it possible to guarantee the security of the network while reducing a load placed on the communication device 10. Therefore, the second embodiment is particularly effective when a system continues to be used without stopping the system even if an attack on a network has been detected.

As described above, a communication system according to the embodiments makes it possible to protect a network while reducing a load placed on a device in a network.

<Others>

The embodiments are not limited to the above embodiments, and various modifications may be made thereto. Some other examples will be described below.

Figure 17:
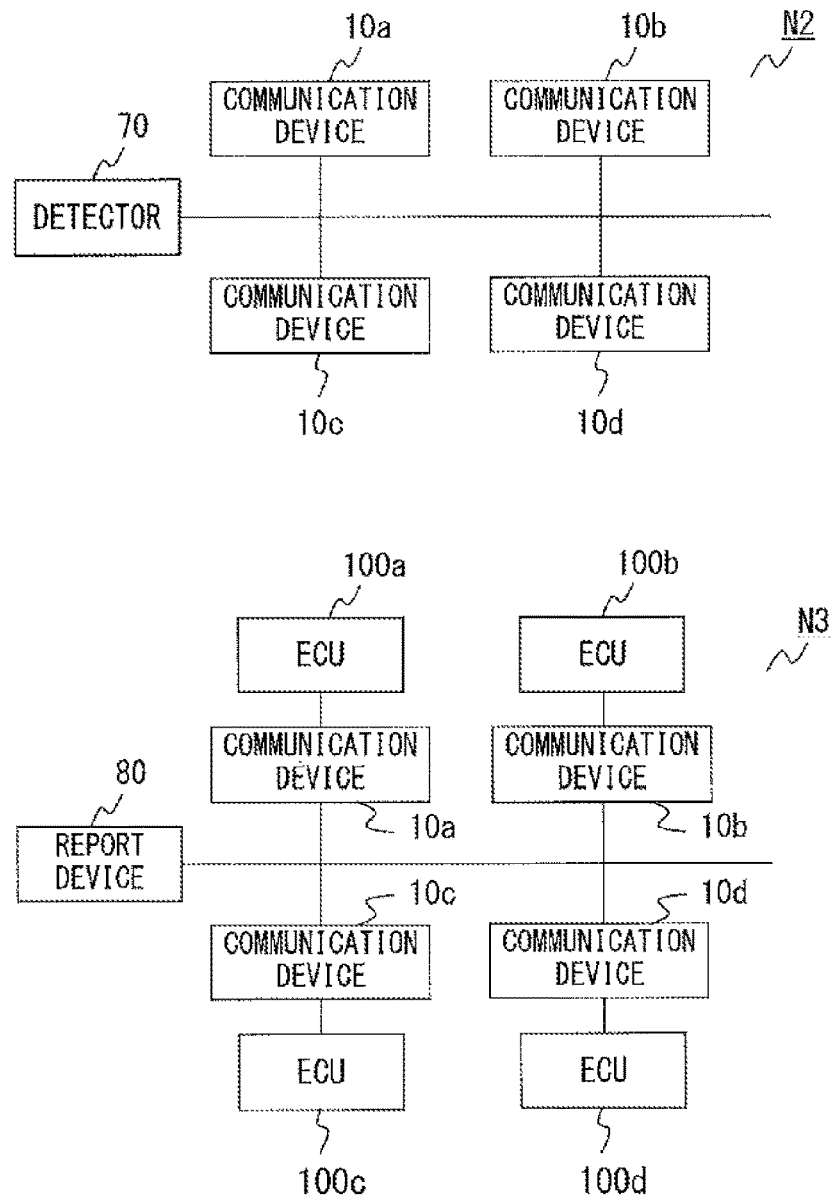
FIG. 17 illustrates a variation of a network.

FIG. 17 illustrates a variation of a network. A network N2 includes the communication devices 10 (10*a* to 10*d*) and a detector 70. In the example of the network N2, each communication network 10 also operates as an ECU of a CAN network. The detector 70 detects an attack on the network N2 using statistics for each ID of a frame transmitted and received in the network. When the detector 70 is included in a network as in the network N2, each communication device 10 does not have to include the attack detector 21. Further, the detector 70 also detects, for example, a termination of an attack on the network. When it identifies an ID for which an attack has been terminated, the detector 70 transmits a return requesting frame that includes the identified ID to a communication device 10 in the network N2.

A network N3 of FIG. 17 includes ECUs 100 (100a to 100d) and a report device 80, and the ECUs 100 are connected such that each of the ECUs 100 is able to communicate with the other devices in the network through a corresponding communication device 10 (10a to 10d). The communication device 10 included in the network N3 does not have to include the report processing unit 25. In this case, when an attack has been detected in the attack detector 21, each of the communication devices 10 reports to the report device 80 about the detection of an attack. When an attack has been detected and an ID for which the attack has been detected are reported by one of the communication devices 10, the report device 80 broadcasts a report frame to the devices in the network N3. When the communication device 10 according to the second embodiment is used in the network N3, the processing unit 42 reports to the report device 80 about an ID for which authentication processing has been determined to be terminated. The report device 80 transmits a return requesting frame in order to report to the communication devices 10 in the network about the ID for which authentication processing has been determined to be terminated. Further, each of the communication devices 10 does not have to hold the frame processing unit 26, and data in a frame determined to be received in the communication device 10 is transferred from the communication device 10 to the ECU 100.

The example in which a MAC authentication is performed on an ID for which an attack has been detected has been described above, but in addition to the ID for which an attack has been detected, an ID whose monitoring is desired to be enhanced due to the detection of an attack may also be added to a MAC authentication target. For example, when an attack on an ID used when reporting on information on a wheel has been detected in a CAN network of a vehicle, a MAC authentication may also be performed on an ID used when reporting on information on a brake, in addition to performing a MAC authentication on the ID for which an attack has been detected. In this case, it is assumed that the report processing unit 25 and the setting unit 22 each store information that identifies an ID for which authentication processing is to be started, the information being associated with the ID for which an attack has been detected.

Further, the case in which a MAC authentication is used when an attack has been detected has been described above, but with respect to an ID for which an attack has been detected, both a MAC authentication and an encryption of CAN data may be used depending on the importance. It is assumed that, with respect to the ID for which both authentication processing and an encryption are used, information on whether encryption is to be performed is registered in addition to an authentication flag.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication system comprising:
   a first communication device that determines, using identification information on a frame, whether to receive the frame; and
   a second communication device that belongs to a network identical to the first communication device, wherein
   when the first communication device receives a report frame from the second communication device, the first communication device sets the frame including target identification information to be an authentication processing target, the report frame reporting on the target identification information and a detection of an attack on the network, the target identification information being identification information included in a frame used to perform the attack,
   upon transmitting a transmission frame set to be the authentication processing target, the first communication device transmits authentication information generated from the transmission frame along with the transmission frame, and
   when authentication processing on the frame including the target identification information has been determined to be terminated, the first communication device exempts the frame including the target identification information from being the authentication processing target, and transmits a request frame that makes a request to terminate the authentication processing on the frame including the target identification information.

2. The communication system according to claim 1, further comprising a third communication device that receives a frame including the target identification information, wherein
   the third communication device
   sets a frame that includes the target identification information to be the authentication processing target when the report frame is received from the second communication device,
   obtains the authentication information and the transmission frame that are transmitted from the first communication device, and
   compares the authentication information obtained from the first communication device with the authentication information generated from the transmission frame.

3. The communication system according to claim 2, wherein
   when the second communication device determines that authentication processing on a frame including the target identification information is to be terminated, the second communication device transmits the request frame to the network.

4. A non-transitory computer-readable recording medium having stored therein a program for causing a communication device included in a network to execute a process, the communication device determining, using identification information on a frame, whether to receive the frame, the process comprising:

when a report frame is received, setting a frame including target identification information to be an authentication processing target, the report frame reporting on the target identification information and a detection of an attack on the network, the target identification information being identification information included in a frame used to perform the attack;

generating authentication information from a transmission frame upon transmitting the transmission frame, the transmission frame being set to be the authentication processing target;

transmitting the authentication information along with the transmission frame;

exempting the frame including the target identification information from being the authentication processing target when authentication processing on the frame including the target identification information has been determined to be terminated; and transmitting a request frame that makes a request to terminate the authentication processing on the frame including the target identification information.

5. The recording medium according to claim 4, wherein the program causes the communication device to execute the process comprising transmitting the report frame to the network when an attack on the network has been detected by monitoring a frame transmitted and received in the network.

6. A communication device that is included in a network and that determines, using identification information on a frame, whether to receive the frame, the communication device comprising:

a communication circuit that performs transmission and reception of a frame between the communication device and other communication devices in the network; and a processor
that sets a frame including target identification information to be an authentication processing target when the communication circuit receives a report frame, the report frame reporting on the target identification information and a detection of an attack on the network, the target identification information being identification information included in a frame used to perform the attack, and
that generates authentication information from a transmission frame upon transmitting the transmission frame set to be the authentication processing target, wherein when authentication processing on the frame including the target identification information has been determined to be terminated,
the processor exempts the frame including the target identification information from being the authentication processing target, and
the communication circuit transmits a request frame that makes a request to terminate the authentication processing on the frame including the target identification information.

7. The communication device according to claim 6, wherein the processor detects an attack on the network by monitoring a frame transmitted and received in the network, and when the processor has detected the attack,
the communication circuit transmits the report frame to the network, and
the processor sets, to be the authentication processing target, a frame that includes identification information used to perform the detected attack.

* * * * *